(12) United States Patent
Park et al.

(10) Patent No.: US 12,284,061 B2
(45) Date of Patent: Apr. 22, 2025

(54) ELECTRONIC DEVICE AND OPERATION METHOD THEREOF

(71) Applicant: SAMSUNG ELECTRONICS CO., LTD., Suwon-si (KR)

(72) Inventors: Kyu-Min Park, Suwon-si (KR); Seung-Woo Lim, Suwon-si (KR); Seung-Pyo Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 6 days.

(21) Appl. No.: 18/331,603

(22) Filed: Jun. 8, 2023

(65) Prior Publication Data

US 2024/0146585 A1 May 2, 2024

(30) Foreign Application Priority Data

Nov. 1, 2022 (KR) ........................ 10-2022-0143578

(51) Int. Cl.
*H03K 5/159* (2006.01)
*H04L 25/03* (2006.01)

(52) U.S. Cl.
CPC .............................. *H04L 25/03343* (2013.01)

(58) Field of Classification Search
CPC ......... H04L 25/03885; H04L 25/03057; H04L 25/03019; H04L 25/0292; H04L 25/03878; H03L 7/0807; H03L 7/0812; H03L 1/0036; H03L 1/0033
USPC ....................................................... 375/229
See application file for complete search history.

(56) References Cited

U.S. PATENT DOCUMENTS

| 8,856,573 | B2 | 10/2014 | Meir |
| 9,785,604 | B2 | 10/2017 | Mejia et al. |
| 10,728,062 | B1 | 7/2020 | Tyson et al. |
| 11,061,849 | B2 | 7/2021 | Yin et al. |
| 11,206,158 | B2 | 12/2021 | Sato |
| 2006/0067387 | A1 | 3/2006 | Ahmed et al. |
| 2008/0152057 | A1* | 6/2008 | Lee ........................ H04L 7/0337 375/346 |

(Continued)

FOREIGN PATENT DOCUMENTS

| CN | 107153553 | 9/2017 |
| CN | 112737713 | 4/2021 |

(Continued)

*Primary Examiner* — Khai Tran
(74) *Attorney, Agent, or Firm* — Morgan, Lewis & Bockius LLP

(57) ABSTRACT

An operation method includes measuring figure of merit (FoM) values for a first group of presets having different preset types, based on equalized signals output from a transmission equalizer included in an external device adjusted based on the first group, identifying a preset type of a first preset corresponding to first FoM value which is a greatest value from among the FoM values for the first group, measuring FoM values for a second group of presets having the identified preset type, based on equalized signals output from the transmission equalizer adjusted based on the second group, determining a second preset corresponding to second FoM value which is a greatest value from among the first FoM value and the FoM values for the second group, and transmitting an equalizing setup request that controls the transmission equalizer to the external device, based on the determined second preset.

20 Claims, 21 Drawing Sheets

(56) References Cited

U.S. PATENT DOCUMENTS

| | | | |
|---|---|---|---|
| 2010/0020858 A1* | 1/2010 | Suwada | H04L 25/4917 375/295 |
| 2014/0307766 A1 | 10/2014 | Karim et al. | |
| 2021/0006330 A1 | 1/2021 | McLoughlin | |
| 2022/0200605 A1* | 6/2022 | Jang | H03L 7/0807 |

FOREIGN PATENT DOCUMENTS

| | | |
|---|---|---|
| CN | 114384294 | 4/2022 |
| JP | 2022040950 | 3/2022 |

\* cited by examiner

FIG. 9

| Preset # | Preshoot(dB) | De-emphasis(dB) |
|---|---|---|
| P4 | 0.0 | 0.0 |
| P1 | 0.0 | -3.5±1 |
| P0 | 0.0 | -6.0±1.5 |
| P9 | 3.5±1 | 0.0 |
| P8 | 3.5±1 | -3.5±1 |
| P7 | 3.5±1 | -6.0±1.5 |
| P5 | 1.9±1 | 0.0 |
| P6 | 2.5±1 | 0.0 |
| P3 | 0.0 | -2.5±1 |
| P2 | 0.0 | -4.4±1.5 |

FIG. 10

| Preset # | Cpost | | | | | | | | |
|---|---|---|---|---|---|---|---|---|---|
| | 0/24 | 1/24 | 2/24 | 3/24 | 4/24 | 5/24 | 6/24 | 7/24 | 8/24 |
| 0/24 | P4 | | | P3 | P1 | P2 | P0 | | |
| 1/24 | | | | | | | | | |
| 2/24 | P5 | | | | | | | | |
| 3/24 | P6 | | | | | P7 | | | |
| 4/24 | P9 | | | P8 | | | | | |
| 5/24 | | | | | | | | | |
| 6/24 | | | | | | | | | |
| Cpre | | | | | | | | | |

FIG. 11

| Preset # | Cpre | Cpost |
|---|---|---|
| P4 | 0.000 | 0.000 |
| P1 | 0.000 | −0.167 |
| P0 | 0.000 | −0.250 |
| P9 | −0.166 | 0.000 |
| P8 | −0.125 | −0.125 |
| P7 | −0.100 | −0.200 |
| P5 | −0.100 | 0.000 |
| P6 | −0.125 | 0.000 |
| P3 | 0.000 | −0.125 |
| P2 | 0.000 | −0.200 |

FIG. 14

| Preset Type 1 | Preset Type 2 | Preset Type 3 | Preset Type 4 |
|---|---|---|---|
| P4 | P0 | P7 | P9 |
|  | P1 | P8 | P5 |
|  | P2 |  | P6 |
|  | P3 |  |  |

FIG. 20

| Preset # | 0/24 | 1/24 | 2/24 | 3/24 | 4/24 | 5/24 | 6/24 | 7/24 | 8/24 |
|---|---|---|---|---|---|---|---|---|---|
| 0/24 | P4 | | | P3 | P1 | P2 | P0 | | |
| 1/24 | | | | | | | | | |
| 2/24 | P5 | | | | | P7 | | | |
| 3/24 | P6 | | | P8 | | | | | |
| 4/24 | P9 | | | | | | | | |
| 5/24 | | | | | | | | | |
| 6/24 | | | | | | | | | |

Cpre (rows) / Cpost (columns)

ELECTRONIC DEVICE AND OPERATION METHOD THEREOF

CROSS-REFERENCE TO RELATED APPLICATIONS

This application claims priority under 35 U.S.C. § 119 to Korean Patent Application No. 10-2022-0143578 filed on Nov. 1, 2022, in the Korean Intellectual Property Office, the disclosure of which is incorporated by reference herein in its entirety.

TECHNICAL FIELD

Embodiments of the present disclosure relate to an electronic device and an operation method thereof, and more particularly, to an electronic device configured to control a transmission equalizer included in another electronic device and an operation method thereof.

DISCUSSION OF RELATED ART

An electronic device may transfer data by transmitting a signal through a channel. As the amount of data that the electronic device processes increases, a speed at which signals are exchanged through the channel also increases. Accordingly, the vulnerability of the signal transferred through the channel to noise may increase, and signal restoration of the electronic device receiving the signal may become more difficult.

To reduce the vulnerability to noise, a transmitting device (e.g., an electronic device transmitting a signal) may perform a "transmission equalizing" operation. For example, the transmitting device may transmit an "equalized signal", which is generated by performing the transmission equalizing operation on an original signal, to a channel. In this case, a receiving device (e.g., an electronic device receiving a signal) may restore the original signal more easily.

The transmitting device and the receiving device may negotiate information utilized to perform the optimized transmission equalizing operation. This negotiation may be referred to as "link equalization".

SUMMARY

Embodiments of the present disclosure provide an electronic device capable of performing a link equalization operation at high speed and an operation method thereof.

According to an embodiment, an operation method of an electronic device which communicates with an external device including a transmission equalizer through a first channel includes measuring figure of merit (FoM) values for a first group of presets having different preset types, based on equalized signals output from the transmission equalizer adjusted based on the first group of presets, identifying a preset type of a first preset corresponding to a first FoM value which is a greatest value from among the FoM values for the first group of presets, measuring FoM values for a second group of presets having the identified preset type, based on equalized signals output from the transmission equalizer adjusted based on the second group of presets, determining a second preset corresponding to a second FoM value which is a greatest value from among the first FoM value and the FoM values for the second group of presets, and transmitting an equalizing setup request that controls the transmission equalizer to the external device, based on the determined second preset.

According to an embodiment, an equalizing controller configured to control an external device including a transmission equalizer includes a preset register circuit that stores a plurality of presets including first to fourth presets, an equalizing request circuit that sequentially outputs a first equalizing adjust request based on the first preset, a second equalizing adjust request based on the second preset, a third equalizing adjust request based on the third preset, and a fourth equalizing adjust request based on the fourth preset, a figure of merit (FoM) measuring circuit that measures first to fourth FoM values respectively associated with the first to fourth presets, based on first to fourth equalized signals respectively output from the transmission equalizer in response to the first to fourth equalizing adjust requests, and a control logic circuit that determines a greatest FoM value among the first to fourth FoM values and identifies a preset type of a preset corresponding to the determined FoM value. The equalizing request circuit outputs an equalizing setup request, which is based on a preset having the identified preset type from among the plurality of presets, to the external device, and the first to fourth presets have different preset types determined depending on preshoot magnitudes and de-emphasis magnitudes of the first to fourth equalized signals.

According to an embodiment, an operation method of an electronic device which communicates with an external device including a transmission equalizer and a first plurality of presets corresponding to a first preset type, a second plurality of presets corresponding to a second preset type, a third plurality of presets corresponding to a third preset type, and a fourth plurality of presets corresponding to a fourth preset type includes measuring a first figure of merit (FoM) value for a first preset, based on a first equalized signal output from the transmission equalizer adjusted based on the first preset, which is one of the first plurality of presets, measuring a second FoM value for a second preset, based on a second equalized signal output from the transmission equalizer adjusted based on the second preset, which is one of the second plurality of presets, measuring a third FoM value for a third preset, based on a third equalized signal output from the transmission equalizer adjusted based on the third preset, which is one of the second plurality of presets, measuring a fourth FoM value for a fourth preset, based on the fourth equalized signal output from the transmission equalizer adjusted based on the fourth preset, which is one of the second plurality of presets, and identifying a preset type of a preset corresponding to a greatest FoM value among the first to fourth FoM values. When the first preset type is identified, the method may further include measuring FoM values for remaining presets other than the first preset among the first plurality of presets, determining a preset corresponding to a greatest FoM value among the first FoM value and the FoM values for the remaining presets, and outputting an equalizing setup request including a preset identifier for the determined preset to the external device.

BRIEF DESCRIPTION OF THE DRAWINGS

The above and other features of the present disclosure will become more apparent by describing in detail embodiments thereof with reference to the accompanying drawings.

FIG. 9 is a table illustrating a preshoot and a de-emphasis for each of a plurality of presets stored in first and second preset register circuits of FIG. 5.

FIG. 10 is a diagram illustrating a plurality of presets and corresponding cursors stored in a first preset register circuit.

FIG. 11 is a diagram illustrating cursors for each preset stored in a first preset register circuit of FIG. 5.

FIG. 14 is a diagram illustrating a method for classifying a preset type, according to an embodiment of the present disclosure.

FIG. 20 is a diagram illustrating a determined preset and cursor sets adjacent thereto, which are stored in a second preset register circuit.

DETAILED DESCRIPTION

Figure 1:
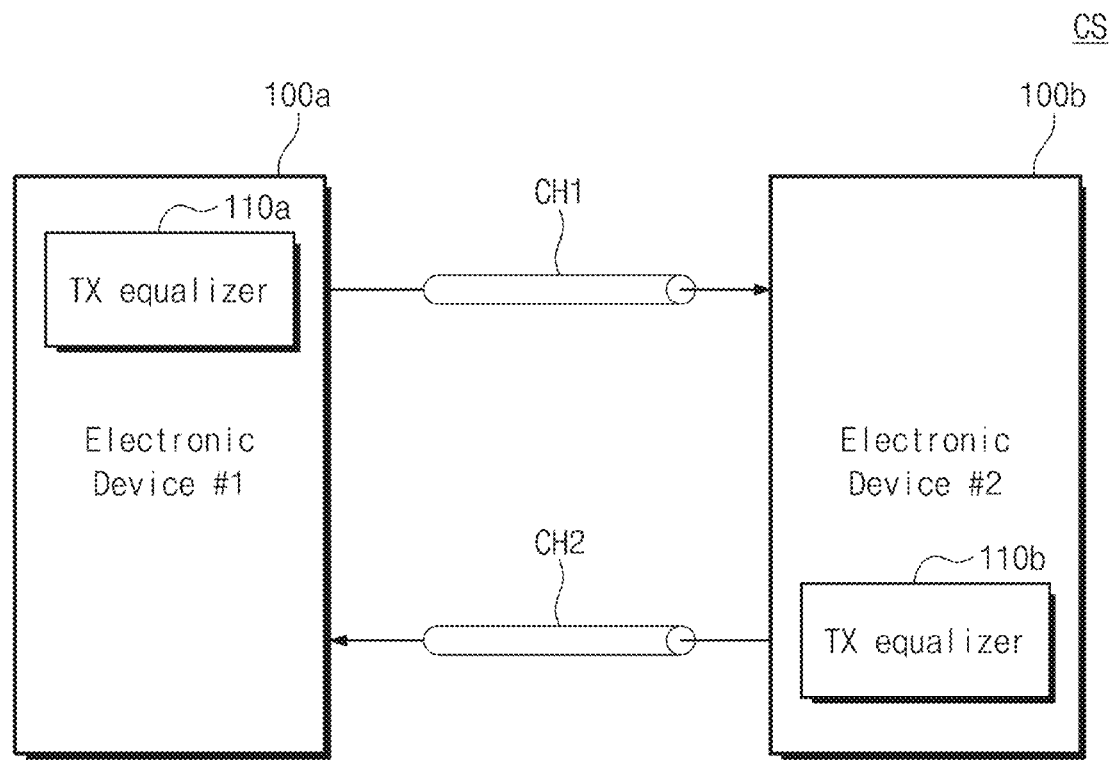
FIG. 1 is a block diagram illustrating a communication system according to an embodiment of the present disclosure.

Embodiments of the present disclosure will be described more fully hereinafter with reference to the accompanying drawings. Like reference numerals may refer to like elements throughout the accompanying drawings.

Components that are described in the detailed description with reference to the terms "circuit", "block", etc. may be implemented with software, hardware, or a combination thereof. For example, the software may be a machine code, firmware, an embedded code, and application software. For example, the hardware may include an electrical circuit, an electronic circuit, a processor, a computer, integrated circuit cores, a pressure sensor, a micro electromechanical system (MEMS), a passive element, or a combination thereof.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

FIG. 1 is a block diagram illustrating a communication system according to an embodiment of the present disclosure. Referring to FIG. 1, a communication system CS may include a first electronic device (Electronic device #1) 100a and a second electronic device (Electronic device #2) 100b.

The first electronic device 100a and the second electronic device 100b may communicate with each other through a first channel CH1 and a second channel CH2. For example, the first electronic device 100a may transmit a signal to the second electronic device 100b through the first channel CH1, and the second electronic device 100b may transmit a signal to the first electronic device 100a through the second channel CH2.

In an embodiment, the first electronic device 100a and the second electronic device 100b may communicate with each other in a serial communication scheme. That is, the first channel CH1 and the second channel CH2 may support serial communication. However, the present disclosure is not limited thereto.

In an embodiment, each of the first electronic device 100a and the second electronic device 100b may communicate based on a peripheral component interconnect express (PCIe) interface. For example, the first electronic device 100a may be a host device, and the second electronic device 100b may be a memory device. However, the present disclosure is not limited thereto. For example, each of the first electronic device 100a and the second electronic device 100b may be one of various types of electronic devices supporting the PCIe interface.

Below, for brief description, it is assumed that the first electronic device 100a and the second electronic device 100b communicate with each other based on the PCIe Gen 3 to PCIe Gen 5 interfaces. For example, below, it is assumed that the first channel CH1 and the second channel CH2 are a PCIe link that is based on the PCIe Gen 3 to PCIe Gen 5 interfaces. However, the present disclosure is not limited thereto.

The first electronic device 100a and the second electronic device 100b may exchange data or signals in the above scheme. When a speed at which the first electronic device 100a and the second electronic device 100b communicate with each other increases, the vulnerability of signals transferred through the first and second channels CH1 and CH2 to noise may increase. The signals that are transferred through the first and second channels CH1 and CH2 may include unintended distortion. To compensate for the unintended distortion, the first electronic device 100a may include a first transmission equalizer (TX equalizer) 110a, and the second electronic device 100b may include a second transmission equalizer (TX equalizer) 110b.

The first transmission equalizer 110a may perform the transmission equalizing operation on a signal to be transferred through the first channel CH1. For example, the first transmission equalizer 110a may perform the transmission equalizing operation on a first original signal and may generate a first equalized signal. The first equalized signal may be transmitted to the second electronic device 100b through the first channel CH1.

The second transmission equalizer 110b may perform the transmission equalizing operation on a signal to be transferred through the second channel CH2. For example, the second transmission equalizer 110b may perform the transmission equalizing operation on a second original signal and may generate a second equalized signal. The second equalized signal may be transmitted to the first electronic device 100a through the second channel CH2.

The first electronic device 100a may transmit a request that controls the second transmission equalizer 110b to the second electronic device 100b through the first channel CH1. In this case, the settings of the second transmission equalizer 110b may be changed based on the received request.

The second electronic device 100b may transmit a request that controls the first transmission equalizer 110a to the first electronic device 100a through the second channel CH2. In this case, the settings of the first transmission equalizer 110a may be changed based on the received request.

That is, a transmission equalizer of each of the first electronic device 100a and the second electronic device 100b may be controlled by an electronic device receiving an equalized signal. Configurations and functions of the first transmission equalizer 110a and the second transmission equalizer 110b will be described in detail with reference to the following drawings.

Figure 2:
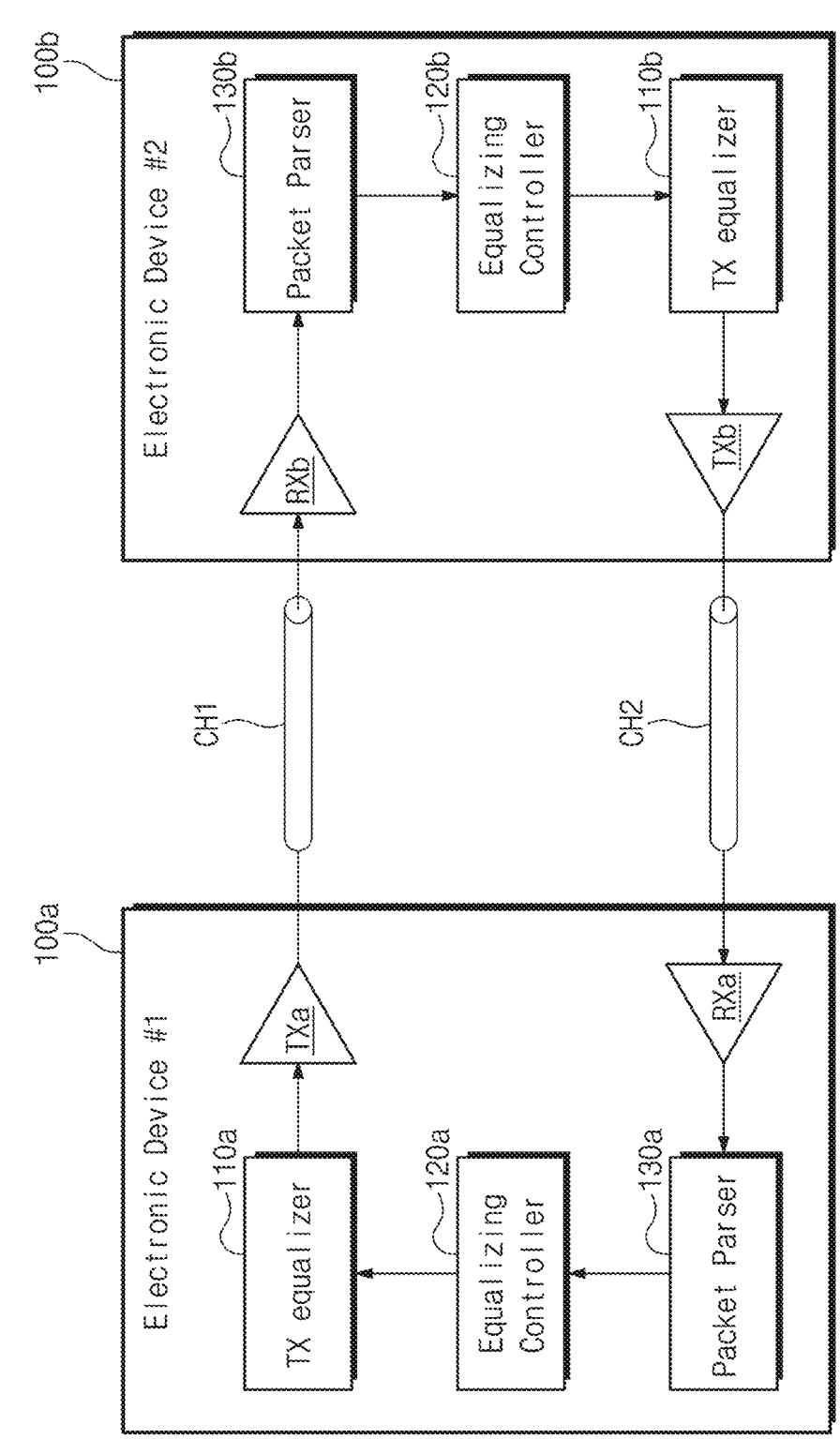
FIG. 2 is a block diagram illustrating a communication system of FIG. 1 in detail.

FIG. 2 is a block diagram illustrating a communication system of FIG. 1 in detail.

Referring to FIG. 2, the first electronic device 100a may include the first transmission equalizer 110a, a first equalizing controller 120a, a first packet parser 130a, a first transmitter TXa, and a first receiver RXa. The second electronic device 100b may include the second transmission equalizer 110b, a second equalizing controller 120b, a second packet parser 130b, a second transmitter TXb, and a second receiver RXb. The first transmission equalizer 110a and the second transmission equalizer 110b are described above, and thus, an additional description thereof will be omitted to avoid redundancy.

Each of the first and second transmission equalizers 110a and 110b may include a finite impulse response (FIR) filter that operates based on a pre-cursor and a post-cursor. Each of the first and second transmission equalizers 110a and 110b may perform the transmission equalizing operation based on the FIR filter. Configurations and operations of the first and second transmission equalizers 110a and 110b will be described in detail with reference to FIGS. 7 and 8.

The first equalizing controller 120a may control the first transmission equalizer 110a in response to the request received from the second electronic device 100b. For example, the second transmission equalizer 110b may transmit the request that controls the first transmission equalizer 110a to the first equalizing controller 120a through the second channel CH2. In this case, the first equalizing controller 120a may control the first transmission equalizer 110a in response to the received request. For example, the first equalizing controller 120a may adjust the pre-cursor and the post-cursor of the FIR filter included in the first transmission equalizer 110a in response to the received request.

The first equalizing controller 120a may provide the first transmission equalizer 110a with the first original signal. In this case, the first transmission equalizer 110a may output the first equalized signal generated by performing the transmission equalizing operation on the first original signal. The first transmitter TXa may receive the first equalized signal and may provide the first equalized signal to the first channel CH1.

The second receiver RXb may receive the first equalized signal through the first channel CH1. For example, the second receiver RXb may receive the first equalized signal by units of packet. The second packet parser 130b may parse the packet of the first equalized signal. The second equalizing controller 120b may measure a figure of merit (FoM) value for the first equalized signal based on the parsed packet. The second equalizing controller 120b may further issue the request that controls the first transmission equalizer 110a based on the measured FoM value.

The second equalizing controller 120b may control the second transmission equalizer 110b in response to the request received from the first electronic device 100a. For example, the first transmission equalizer 110a may transmit the request that controls the first transmission equalizer 110a to the second equalizing controller 120b through the first channel CH1. In this case, the second equalizing controller 120b may control the second transmission equalizer 110b in response to the received request. For example, the second equalizing controller 120b may adjust the pre-cursor and the post-cursor of the FIR filter included in the second transmission equalizer 110b in response to the received request.

The second equalizing controller 120b may provide the second transmission equalizer 110b with the second original signal. In this case, the second transmission equalizer 110b may output the second equalized signal generated by performing the transmission equalizing operation on the second original signal. The second transmitter TXb may receive the second equalized signal and may provide the second equalized signal to the second channel CH2.

The first receiver RXa may receive the second equalized signal through the second channel CH2. For example, the first receiver RXa may receive the second equalized signal by units of packet. The first packet parser 130a may parse the packet of the second equalized signal. The first equalizing controller 120a may measure the FoM value for the second equalized signal based on the parsed packet. The first equalizing controller 120a may further issue the request that controls the second transmission equalizer 110b based on the measured FoM value.

That is, according to an embodiment of the present disclosure, the first equalizing controller 120a may issue the request that controls the second transmission equalizer 110b to the second equalizing controller 120b. In contrast, the second equalizing controller 120b may issue the request that controls the first transmission equalizer 110a to the first equalizing controller 120a. Configurations and operations of first and second equalizing controllers 120a and 120b will be described in detail with reference to FIGS. 3 to 6.

Figure 3:
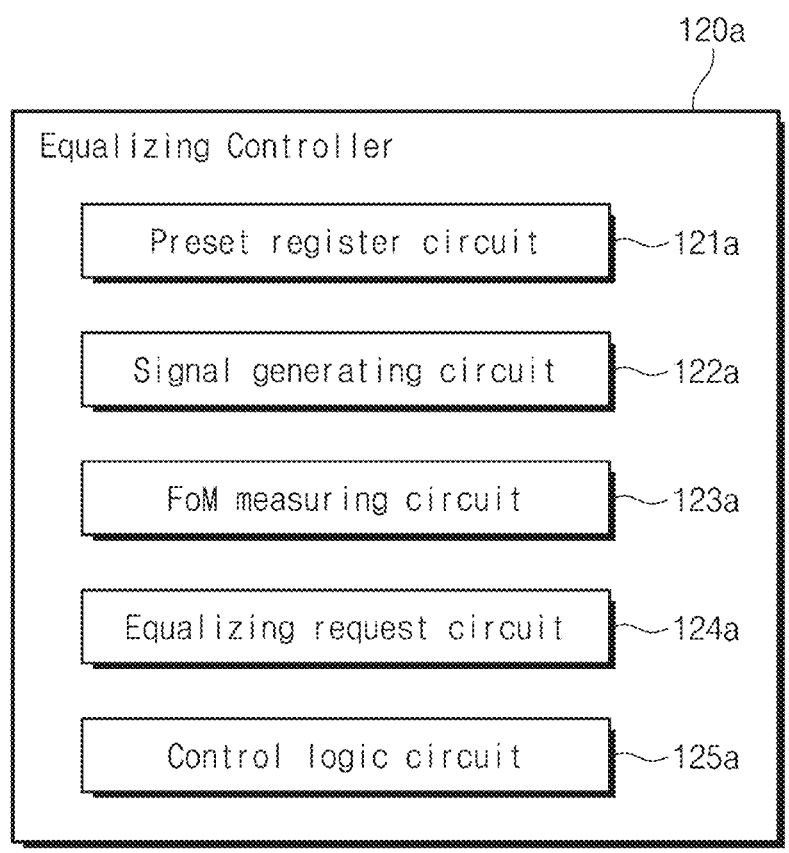
FIG. 3 is a block diagram illustrating a first equalizing controller of FIG. 2 in detail.

FIG. 3 is a block diagram illustrating a first equalizing controller of FIG. 2 in detail.

Referring to FIGS. 2 and 3, the first equalizing controller 120a may include a first preset register circuit 121a, a first signal generating circuit 122a, a first FoM measuring circuit 123a, a first equalizing request circuit 124a, and a first control logic circuit 125a. Below, the configuration of the first equalizing controller 120a will be described with reference to FIG. 3, but it may be understood that a configuration of the second equalizing controller 120b is similar thereto. For example, the second equalizing controller 120b may include a second preset register circuit 121b, a second signal generating circuit, a second FoM measuring circuit 123b, a second equalizing request circuit, and a second control logic circuit. The components of the second equalizing controller 120b may perform functions that are similar to those of the components of the first equalizing controller 120a.

The first preset register circuit 121a may store a plurality of presets. Each of the plurality of presets may be used to control the pre-cursor and the post-cursor of the second transmission equalizer 110b.

In an embodiment, the first preset register circuit 121a may store information about, for example, a preshoot magnitude, a de-emphasis magnitude, a pre-cursor, and a post-cursor for each of the plurality of presets. The information for each preset stored in the first preset register circuit 121a will be described in detail with reference to FIGS. 9 to 11.

In an embodiment, the plurality of presets may have various preset types. The preset type for each of the plurality of presets will be described in detail with reference to FIG. 14.

The first signal generating circuit 122a may generate an original signal. The first transmission equalizer 110a may perform the transmission equalizing operation based on the original signal thus generated. In an embodiment, the original signal may include a packet or a bit stream promised to the second electronic device 100b before the link equalization is performed.

The first FoM measuring circuit 123a may measure the FoM value for the equalized signal received from the second electronic device 100b. That is, the first FoM measuring circuit 123a may evaluate whether the transmission equalizing operation is being appropriately performed by the second transmission equalizer 110b, based on the equalized signal received from the second electronic device 100b.

In an embodiment, the first FoM measuring circuit 123a may measure the FoM value based on an eye diagram of the received equalized signal. For example, the first FoM measuring circuit 123a may measure the FoM value based on one or more parameters such as, for example, an eye width, an eye height, and an eye area. The eye diagram will be described in detail with reference to FIG. 12.

The first equalizing request circuit 124a may output an equalizing adjust request to the second electronic device 100b based on the FoM value measured by the first FoM measuring circuit 123a. For example, the first equalizing request circuit 124a may transmit the equalizing adjust request to the second equalizing controller 120b through the first channel CH1.

For example, the first equalizing request circuit 124a may generate the equalizing adjust request based on the plurality of presets of the first preset register circuit 121a. For example, the first equalizing request circuit 124a may issue the equalizing adjust request that is based on a preset selected from the plurality of presets of the first preset register circuit 121a. In this case, the issued equalizing adjust request may refer to a signal that requests the second equalizing controller 120b to control the second transmission equalizer 110b based on the selected preset.

As such, the second transmission equalizer 110b may be controlled based on the issued equalizing adjust request. That is, the pre-cursor and the post-cursor of the FIR filter included in the second transmission equalizer 110b may be adjusted based on the equalizing adjust request. The second transmission equalizer 110b may provide the equalized signal to the second channel CH2 based on the adjusted pre-cursor and post-cursor. In this case, the first FoM measuring circuit 123a may measure the FoM value for the selected preset based on the equalized signal thus received.

In an embodiment, the equalizing adjust request may include a preset identifier. For example, the equalizing adjust request may include an identifier indicating whether to control the second transmission equalizer 110b based on any preset (or indicating a preset that is used to control the second transmission equalizer 110b). Below, an embodiment in which the equalizing adjust request includes a preset identifier will be described. That is, below, an embodiment in which a transmission equalizer is controlled based on a preset will be described. However, the present disclosure is not limited thereto. For example, the equalizing adjust request may include pre-cursor and post-cursor values of the FIR filter included in the second transmission equalizer 110b instead of the preset. For example, the first equalizing request circuit 124a may issue the equalizing adjust request including the pre-cursor and post-cursor values, instead of issuing the equalizing adjust request including an identifier associated with one of the plurality of presets stored in the first preset register circuit 121a. In this case, the second equalizing controller 120b may control the FIR filter included in the second equalizing controller 120b based on the pre-cursor and post-cursor value included in the received equalizing adjust request.

In an embodiment, the first preset register circuit 121a and the second preset register circuit 121b may share the same preset identifier. That is, the plurality of presets that the first electronic device 100a stores may respectively correspond to the plurality of presets that the second electronic device 100b stores. For example, when the first electronic device 100a transmits the equalizing adjust request including the preset identifier for a first preset to the second electronic device 100b, the second electronic device 100b may control the second transmission equalizer 110b based on the first preset.

In an embodiment, cursors that the first preset register circuit 121a and the second preset register circuit 121b store with regard to the same preset may be different. For example, depending on a way to implement the first and second electronic devices 100a and 100b (e.g., depending on a full-swing (FS) magnitude set for each electronic device), the first and second preset register circuits 121a and 121b may store different pre-cursor and post-cursor values with regard to the first preset identifier. However, the present disclosure is not limited thereto.

The first control logic circuit 125a may control an overall operation of the first equalizing controller 120a. For example, the first control logic circuit 125a may select one of the plurality of presets of the first preset register circuit 121a and may allow the first equalizing request circuit 124a to issue the equalizing adjust request based on the selected preset.

The first control logic circuit 125a may compare FoM values that are measured with respect to the plurality of presets of the first preset register circuit 121a. The first control logic circuit 125a may determine a preset corresponding to the highest FoM value among the measured FoM values and may determine to set up the second transmission equalizer 110b based on the determined preset. For example, the first equalizing request circuit 124a may output an equalizing setup request to the second electronic device 100b based on the determination of the first control logic circuit 125a. In this case, the second transmission equalizer 110b may perform the transmission equalizing operation based on a preset corresponding to the equalizing setup request. In other words, the equalizing setup request may refer to a signal for finally selecting a preset to be used for the operation of the second transmission equalizer 110b.

In an embodiment, a configuration of the equalizing setup request may be similar to a configuration of the equalizing adjust request. For example, the equalizing setup request may include a packet having the same configuration as the equalizing adjust request. That is, the equalizing setup request may include a relevant preset identifier. However, the present disclosure is not limited thereto. For example, the equalizing setup request may include pre-cursor and post-cursor values of the FIR filter included in the second transmission equalizer 110b.

Figure 4:
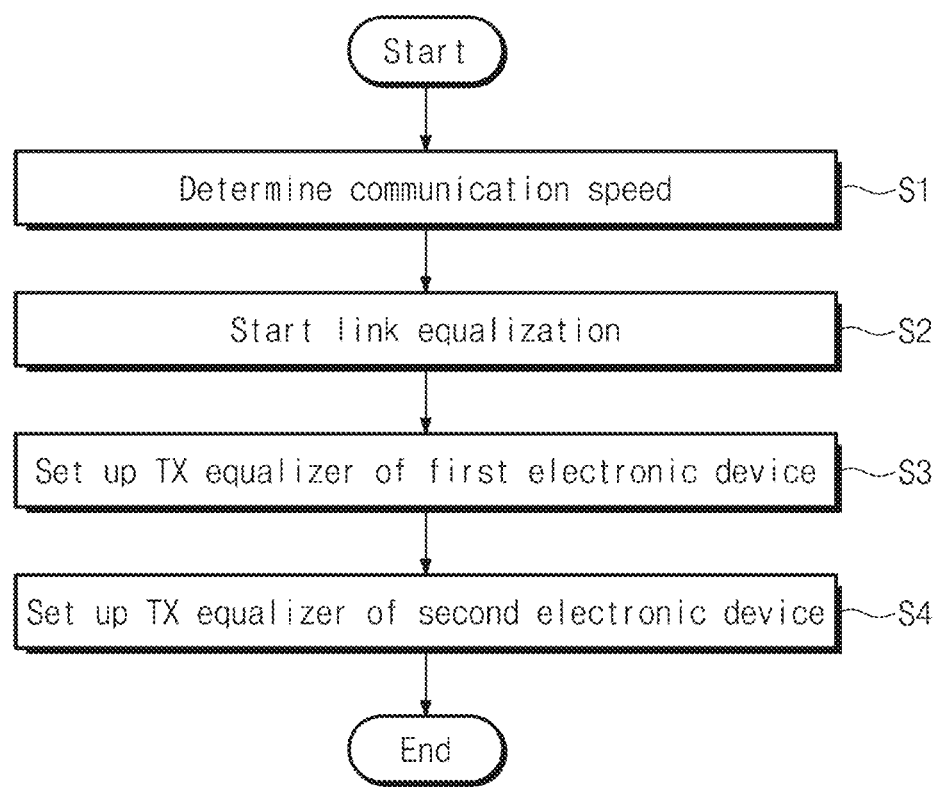
FIG. 4 is a flowchart illustrating an operation method of a communication system of FIG. 2.

FIG. 4 is a flowchart illustrating an operation method of a communication system of FIG. 2. Referring to FIGS. 2 to 4, in operation S1, the communication system CS may determine a communication speed. For example, the first and second electronic devices 100a and 100b may determine a speed at which the first and second electronic devices 100a and 100b will communicate with each other. Below, it is assumed that the communication speed between the first and second electronic devices 100a and 100b is determined to be 8.0 GT/s, 16.0 GT/s, or 32.0 GT/s.

In an embodiment, when the communication speed between the first and second electronic devices 100a and 100b is determined to be lower than 8.0 GT/s, operation S2 to operation S4 may be omitted. For example, when it is determined that the first and second electronic devices 100a and 100b communicate with each other at the communication speed of 2.5 GT/s or 5.0 GT/s, operation S2 to operation S4 may be omitted.

In operation S2, the communication system CS may start the link equalization. For example, the first and second electronic devices 100a and 100b may exchange a plurality of packets indicating the start of the link equalization.

In an embodiment, in operation S2, the first and second electronic devices 100a and 100b may exchange information necessary for the link equalization. For example, the first and second electronic devices 100a and 100b may determine whether the equalizing adjust request to be transferred during the link equalization operation (e.g., in operation S3 and operation S4 below) includes a "preset identifier" or a "pre-cursor and post-cursor". However, the present disclosure is not limited thereto.

In operation S3, the communication system CS may set up the first transmission equalizer 110a of the first electronic device 100a. For example, the second electronic device 100b may determine an optimal preset for the first transmission equalizer 110a while transmitting a plurality of equalizing adjust requests to the first electronic device 100a. The second electronic device 100b may transmit the equalizing setup request to the first electronic device 100a, based on the determined preset. The first equalizing controller 120a may set up the pre-cursor and the post-cursor of the FIR filter of the first transmission equalizer 110a in based to the equalizing setup request.

In operation S4, the communication system CS may set up the second transmission equalizer 110b of the second electronic device 100b. For example, the first electronic device 100a may determine an optimal preset for the second transmission equalizer 110b while transmitting a plurality of equalizing adjust requests to the second electronic device 100b. The first electronic device 100a may transmit the equalizing setup request to the second electronic device 100b, based on the identified preset. The second equalizing controller 120b may set up the pre-cursor and the post-cursor of the FIR filter of the second transmission equalizer 110b based on the equalizing setup request.

Through operation S3 and operation S4, the link equalization operation for the first transmission equalizer 110a and the second transmission equalizer 110b may be completed. After operation S4, the first and second electronic devices 100a and 100b may communicate with each other through the first and second transmission equalizers 110a and 110b whose link equalization is completed.

As described above, operation S3 and operation S4 may be substantially identical to each other except that targets of the link equalization operation are different. Thus, for brief description, operation S3 will be described below. However, the present disclosure is not limited thereto. For example, the descriptions to be given with reference to the following drawings may be applied to operation S4. Operation S3 will be described in detail with reference to FIGS. 5 and 6.

Figure 5:
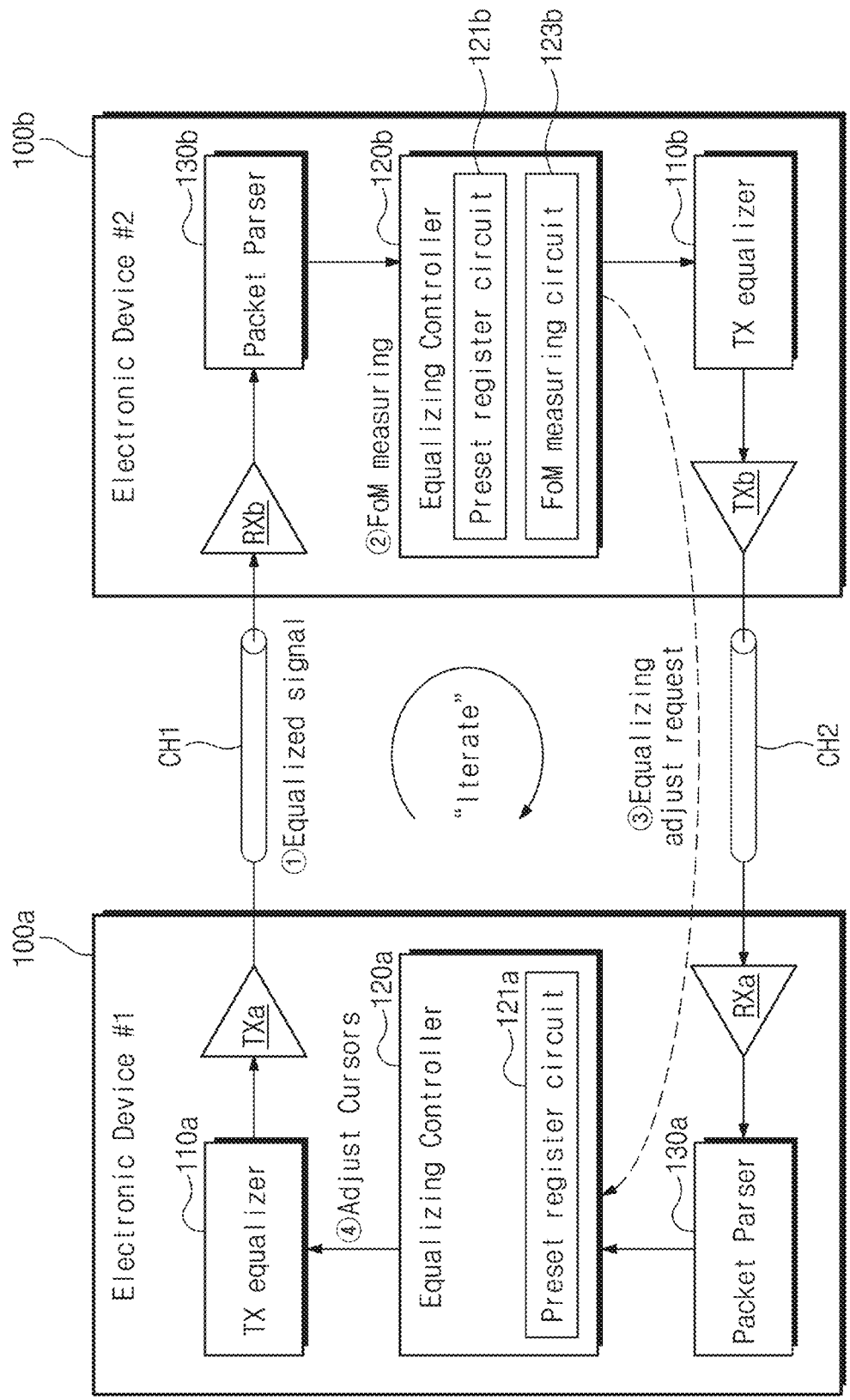
FIGS. 5 and 6 are diagrams for describing operation S3 of FIG. 4 in detail.
Figure 6:
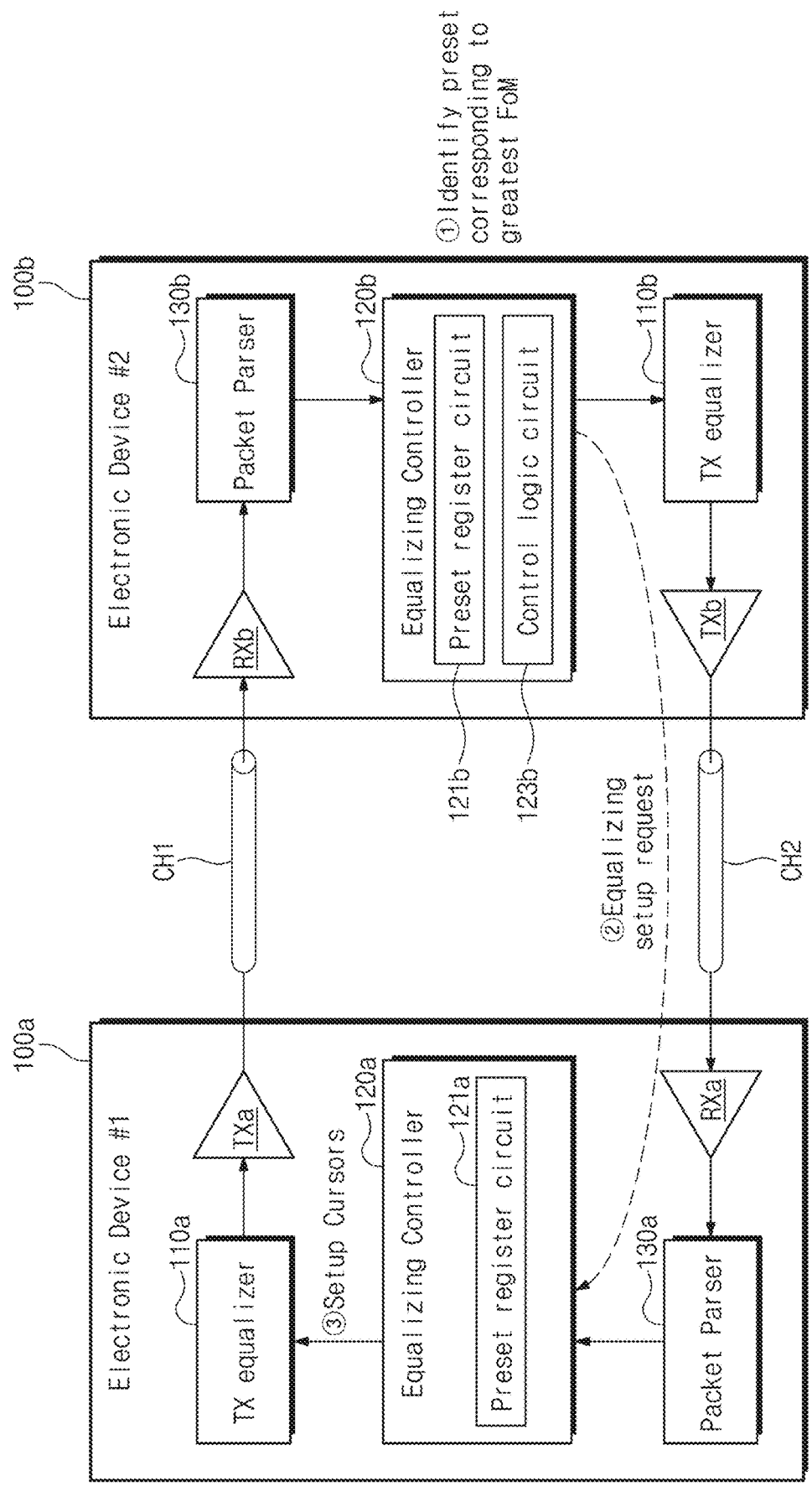

FIGS. 5 and 6 are diagrams for describing operation S3 of FIG. 4 in detail. Below, a way to determine an optimal preset for the first transmission equalizer 110a will be described with reference to FIG. 5, and a way to set up the first transmission equalizer 110a based on the optimal preset thus determined will be described with reference to FIG. 6.

Referring to FIGS. 2 to 5, an equalized signal may be transferred through the first channel CH1 (①Equalized signal).

The second equalizing controller 120b may measure a FoM value for the received equalized signal by using the second FoM measuring circuit 123b (②FoM measuring). That is, the second equalizing controller 120b may measure the FoM value for a preset corresponding to the equalized signal thus received.

The second equalizing controller 120b may output the equalizing adjust request to the first equalizing controller 120a (③Equalizing adjust request). In this case, the equalizing adjust request may include the preset identifier for one of the plurality of presets stored in the second preset register circuit 121b.

The first equalizing controller 120a may adjust cursors of the first transmission equalizer 110a in response to the equalizing adjust request (④Adjust Cursors). For example, the first equalizing controller 120a may determine a pre-cursor and a post-cursor corresponding to the preset identifier included in the equalizing adjust request through the first preset register circuit 121a. The first equalizing controller 120a may change a pre-cursor and a post-cursor of the FIR filter included in the first transmission equalizer 110a, based on the determined pre-cursor and post-cursor.

The first transmission equalizer 110a may output a new equalized signal based on the changed pre-cursor and post-cursor (①Equalized signal). The second equalizing controller 120b may measure a FoM value for the new equalized signal by using the second FoM measuring circuit 123b (②FoM measuring).

That is, through the iterations, the second electronic device 100b may sequentially measure FoM values for the plurality of presets stored in the second preset register circuit 121b.

In an embodiment, a way to sweep the plurality of presets stored in the second preset register circuit 121b may be determined by the second control logic circuit. That is, a way to measure a FoM value for each of the plurality of presets stored in the second preset register circuit 121b may be determined under control of the second control logic circuit. For example, the second control logic circuit may determine the order of measuring the FoM value for each of the plurality of presets. The second control logic circuit may determine to measure FoM values with respect to some of the plurality of presets stored in the second preset register circuit 121b.

In an embodiment, the second control logic circuit may omit the measurement of FoM values for some of the plurality of presets, based on a preset type of the plurality of presets stored in the second preset register circuit 121b. In this case, the sweep for the plurality of presets may be simplified, and the link equalization operation may be performed at higher speed. The sweep scheme that the second control logic circuit determines will be described in detail with reference to FIGS. 13 to 19.

Referring to FIGS. 2 to 6, the second equalizing controller 120b may identify a preset corresponding to the greatest FoM value among the measured FoM values (① Identify preset corresponding to greatest FoM). For example, the second control logic circuit may compare the FoM values for the plurality of presets stored in the second preset register circuit 121b.

The second equalizing controller 120b may output the equalizing setup request that is based on the identified preset (②Equalizing setup request). For example, the second equalizing request circuit may issue the equalizing setup request including the preset identifier for the identified preset (e.g., preset corresponding to the greatest FoM value). The equalizing setup request may be transmitted to the first equalizing controller 120a through the second channel CH2.

The first equalizing controller 120a may set up cursors of the first transmission equalizer 110a in response to the equalizing setup request (③Setup Cursors). For example, the first equalizing controller 120a may determine a pre-cursor and a post-cursor corresponding to the preset identifier included in the equalizing setup request by using the first preset register circuit 121a. The first equalizing controller 120a may set up each of the pre-cursor and the post-cursor of the FIR filter included in the first transmission equalizer 110a, based on the determined pre-cursor and post-cursor.

Figure 7:
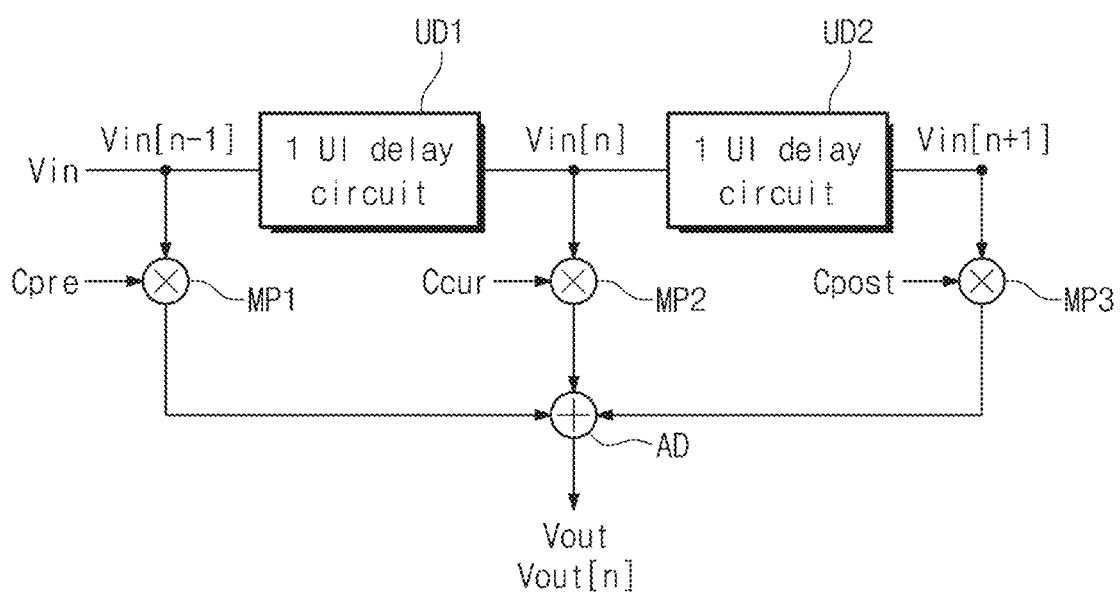
FIG. 7 is a diagram illustrating a finite impulse response (FIR) filter included in a first transmission equalizer of FIG. 5.

FIG. 7 is a diagram illustrating a finite impulse response (FIR) filter included in a first transmission equalizer of FIG. 5. The FIR filter included in the second transmission equalizer 110b of FIG. 1 may be implemented to be similar to the FIR filter included in the first transmission equalizer 110a without limitation to the example of FIG. 7.

Referring to FIG. 7, the finite impulse response (FIR) filter FIR may receive a voltage Vin. The voltage Vin may correspond to an original signal generated from the first signal generating circuit 122a.

The FIR filter "FIR" may include a first unit interval delay circuit UD1 and a second unit interval delay circuit UD2. Each of the first and second unit interval delay circuits UD1 and UD2 may delay the timing to transfer a signal.

The FIR filter "FIR" may include a first multiplier MP1, a second multiplier MP2, and a third multiplier MP3. The first multiplier MP1, the second multiplier MP2, and the third multiplier MP3 may operate based on a pre-cursor Cpre, a current-cursor Ccur, and a post-cursor Cpost, respectively.

In an embodiment, assuming that the voltage Vin is determined for each unit interval, a voltage Vin[n−1] may be provided to an input terminal of the first unit interval delay circuit UD1, a voltage Vin[n] may be provided to an output terminal of the first unit interval delay circuit UD1, and a voltage Vin[n+1] may be provided to an output terminal of the second unit interval delay circuit UD2. In this case, the first multiplier MP1 may multiply the voltage Vin[n−1] by the pre-cursor Cpre, the second multiplier MP2 may multiply the voltage Vin[n] by the current-cursor Ccur, and the third multiplier MP1 may multiply the voltage Vin[n+1] by the post-cursor Cpost.

In an embodiment, the pre-cursor, the current-cursor, and the post-cursor may be determined based on the relationship expressed by Equation 1 below.

$$|Cpre|+|Ccur|+|Cpost|=1, Cpre \leq 0, Cpost \leq 0 \quad \text{Equation 1}$$

Herein, $|Cpre|$ represents a magnitude of the pre-cursor Cpre, $|Ccur|$ represents a magnitude of the current-cursor Ccur, and $|Cpost|$ represents a magnitude of the post-cursor Cpost. The pre-cursor Cpre and the post-cursor Cpost may always have a value of 0 or less. That is, as the magnitudes of the pre-cursor Cpre and the post-cursor Cpost are determined through the relationship of Equation 1 above, the magnitude of the current-cursor Ccur may be smoothly determined.

The FIR filter "FIR" may further include an adder AD. The adder AD may add outputs of the first to third multipliers MP to MP3. That is, an output voltage output from the adder AD may be determined by Equation 2 below.

$$Vout[n]=Vin[n-1] \times Cpre + Vin[n] \times Ccur + Vin[n+1] \times Cpost \quad \text{Equation 2}$$

That is, referring to Equation 2 above, an output voltage Vout of the FIR filter "FIR" corresponding to any point in time may be determined in consideration of magnitudes of the input voltage Vin corresponding to a previous point in time and a next point in time.

Figure 8:
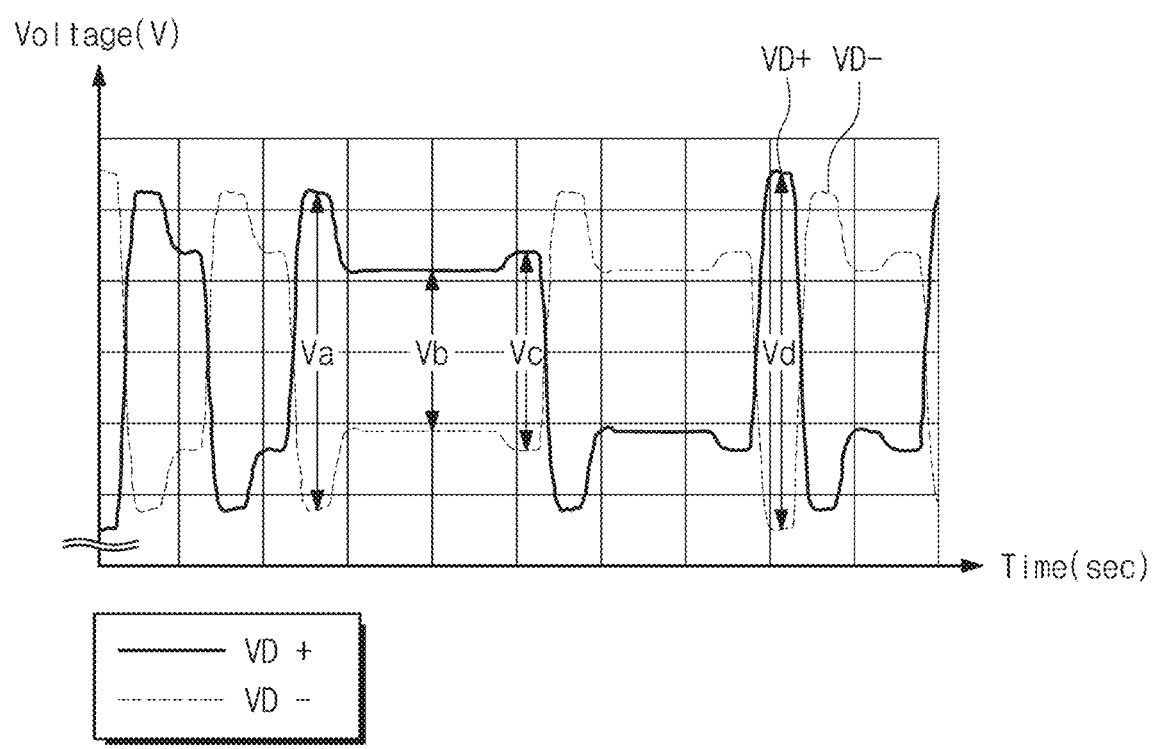
FIG. 8 is a diagram illustrating an output of a first transmission equalizer of FIG. 5 including an FIR filter of FIG. 7.

FIG. 8 is a diagram illustrating an output of a first transmission equalizer of FIG. 5 including an FIR filter of FIG. 7.

In FIG. 8, a horizontal axis represents a time, and a vertical axis represents a level of a voltage. Referring to FIGS. 5, 7, and 8, the first transmission equalizer 110a may output the equalized signal in a differential voltage scheme. That is, the equalized signal may include a first equalized voltage VD+ and a second equalized voltage VD−. A solid line indicates the first equalized voltage VD+, and a dashed line indicates the second equalized voltage VD−.

In an embodiment, a sum of the first equalized voltage VD+ and the second equalized voltage VD− may be uniform.

In an embodiment, even though the original signal transfers consecutive bits having the same logical value (e.g., even in the case where a logical value of 1 is repeatedly transferred), the first and second equalized voltage VD+ and VD− may not have a uniform voltage level. Below, it is assumed that a bit stream of the original signal is composed of 0, 0, 1, 1, 1, 1, 0, 0, 1, and 0, and a voltage level of an equalized signal generated under the assumption will be described.

In an embodiment, differences of the first and second equalized voltage VD+ and VD− associated with four consecutive bits having a logical value of 1 may not be uniform. For example, a difference of the first and second equalized voltage VD+ and VD− corresponding to the most significant bit (e.g., a bit just after a bit having a logical value of 0) among the four consecutive bits having a logical value of 1 may be a first voltage difference Va. A difference of the first and second equalized voltage VD+ and VD− corresponding to the least significant bit (e.g., a bit just before a bit having a logical value of 0) among the four consecutive bits having a logical value of 1 may be a third voltage difference Vc. A difference of the first and second equalized voltage VD+ and VD− corresponding to each of two bits positioned between the most significant bit and the least significant bit from among the four consecutive bits having a logical value of 1 may be a second voltage difference Vb. In this case, the third voltage difference Vc may be associated with the preshoot, and a second voltage difference may be associated with the de-emphasis.

That is, when the transmission equalizing operation is performed on the original signal that includes first to N-bit bits being consecutive and having the same logical value (for example, the first to N-th bits may be positioned between two bits whose logical value is different from that of the first to N-th bits), a difference of the first and second equalized voltage VD+ and VD− corresponding to the first bit may be the first voltage difference Va, a difference of the first and second equalized voltage VD+ and VD− corresponding to each of the second to (N−1)-th bits may be the second voltage difference Vb, and a difference of the first and second equalized voltage VD+ and VD− corresponding to the N-th bit may be the third voltage difference Vc.

In an embodiment, when three consecutive bits have logical values of 0, 1, and 0, a difference of the first and second equalized voltage VD+ and VD− corresponding to a bit having a logical value of 1 may be a fourth voltage difference Vd.

That is, when the transmission equalizing operation is performed on the original signal including three consecutive bits in which first and third bits have the same logical value and a second bit positioned between the first and third bits has a logical value different from that of the first and third logical values, a difference of the first and second equalized voltage VD+ and VD− corresponding to the second bit may be the fourth voltage difference Vd.

In an embodiment, magnitudes of the first voltage difference Va to the fourth voltage difference Vd may be determined based on magnitudes of the pre-cursor Cpre and the post-cursor Cpost. For example, each of the first and second equalized voltage VD+ and VD− may be determined based on the pre-cursor Cpre and the post-cursor Cpost of the FIR filter. Accordingly, the magnitudes of the first voltage difference Va to the fourth voltage difference Vd may be determined based on the magnitudes of the pre-cursor Cpre and the post-cursor Cpost.

In an embodiment, the magnitude of the preshoot may be determined based on Equation 3 below. The magnitude of the de-emphasis may be determined based on Equation 4 below.

$$\text{Preshoot(dB)} = 20 \log (Vc/Vb) \quad \text{Equation 3}$$

$$\text{De-emphasis(dB)} = 20 \log (Vb/Va) \quad \text{Equation 4}$$

Herein, Preshoot(dB) indicates a magnitude of a preshoot, De-emphasis(dB) indicates a magnitude of a de-emphasis, Va indicates the first voltage difference Va, Vb indicates the second voltage difference Vb, and Vc indicates the third voltage difference Vc.

FIG. 9 is a table illustrating a preshoot and a de-emphasis for each of a plurality of presets stored in first and second preset register circuits of FIG. 5. Referring to FIGS. 5 and 7 to 9, each of the first and second preset register circuits 121a and 121b may store 0-th to ninth presets P0 to P9.

Below, for brief description, preset identifiers of the 0-th to ninth presets P0 to P9 may be respectively marked by "P0", "P1", "P2", "P3", "P4", "P5", "P6", "P7", "P8", and "P9". However, the present disclosure is not limited thereto.

The 0-th to ninth presets P0 to P9 may respectively correspond to combinations of different preshoot magnitudes and different de-emphasis magnitudes. For example, the fourth preset P4 may correspond to a preshoot magnitude of 0.0 dB and a de-emphasis magnitude of 0.0 dB, and the seventh preset P7 may correspond to a preshoot magnitude of 3.5±1 dB and a de-emphasis magnitude of −6.0±1.5 dB. For brief description, combinations of preshoot and de-emphasis magnitudes associated with the remaining presets will not be described.

FIG. 10 is a diagram illustrating a plurality of presets and corresponding cursors stored in a first preset register circuit. Referring to FIGS. 5 and 7 to 10, the first preset register circuit 121a may store the 0-th to ninth presets P0 to P9. Also, the first preset register circuit 121a may store the pre-cursor Cpre and the post-cursor Cpost associated with each of the 0-th to ninth presets P0 to P9.

Values of the pre-cursor Cpre and the post-cursor Cpost associated with each of the 0-th to ninth presets P0 to P9 may be determined based on a way to implement the first electronic device 100a. For example, when a full swing (FS) value of the first electronic device 100a is 24, values of the pre-cursor Cpre and the post-cursor Cpost stored in the first preset register circuit 121a may be discretely determined in units of 1/24 granularity. That is, an embodiment in which the full swing (FS) value of the first electronic device 100a is 24 will be described below, but the present disclosure is not limited thereto. For example, when a full swing (FS) value of the second electronic device 100b is 32, values of the pre-cursor Cpre and the post-cursor Cpost stored in the second preset register circuit 121b may be discretely determined in units of 1/32 granularity.

Continuing to refer to FIG. 10, the first preset register circuit 121a may store the pre-cursor Cpre and the post-cursor Cpost that are determined to correspond to a preshoot and de-emphasis range for each of the 0-th to ninth presets P0 to P9 of FIG. 9. For example, the first preset register circuit 121a may store magnitudes of the pre-cursor Cpre and the post-cursor Cpost of the seventh preset P7, that is, "2/24" and "5/24", which are determined to correspond to a preshoot magnitude of 3.5±1 dB and a de-emphasis magnitude of −6.0±1.5 dB. The first preset register circuit 121a may store the pre-cursor Cpre and the post-cursor Cpost for each of the 0-th to ninth presets P0 to P9, which are determined to be similar to the above scheme. The pre-cursor Cpre and the post-cursor Cpost that are stored in the first preset register circuit 121a for each of the 0-th to ninth presets P0 to P9 will be described in detail with reference to FIG. 11.

FIG. 11 is a diagram illustrating cursors for each preset stored in a first preset register circuit of FIG. 5. Referring to FIGS. 5 and 7 to 11, the first preset register circuit 121a may store the 0-th to ninth presets P0 to P9. The first preset register circuit 121a may store values of the pre-cursor Cpre and the post-cursor Cpost for each of the 0-th to ninth presets P0 to P9.

For example, the first preset register circuit 121a may store a pre-cursor (Cpre) value of "0.000" and a post-cursor (Cpost) value of "0.000" with regard to the fourth preset P4 and may store a pre-cursor (Cpre) value of "−0.100" and a post-cursor (Cpost) value of "−0.200" with regard to the seventh preset P7. For brief description, values of the pre-cursor Cpre and the post-cursor Cpost associated with the remaining presets will not be described.

Figure 12:
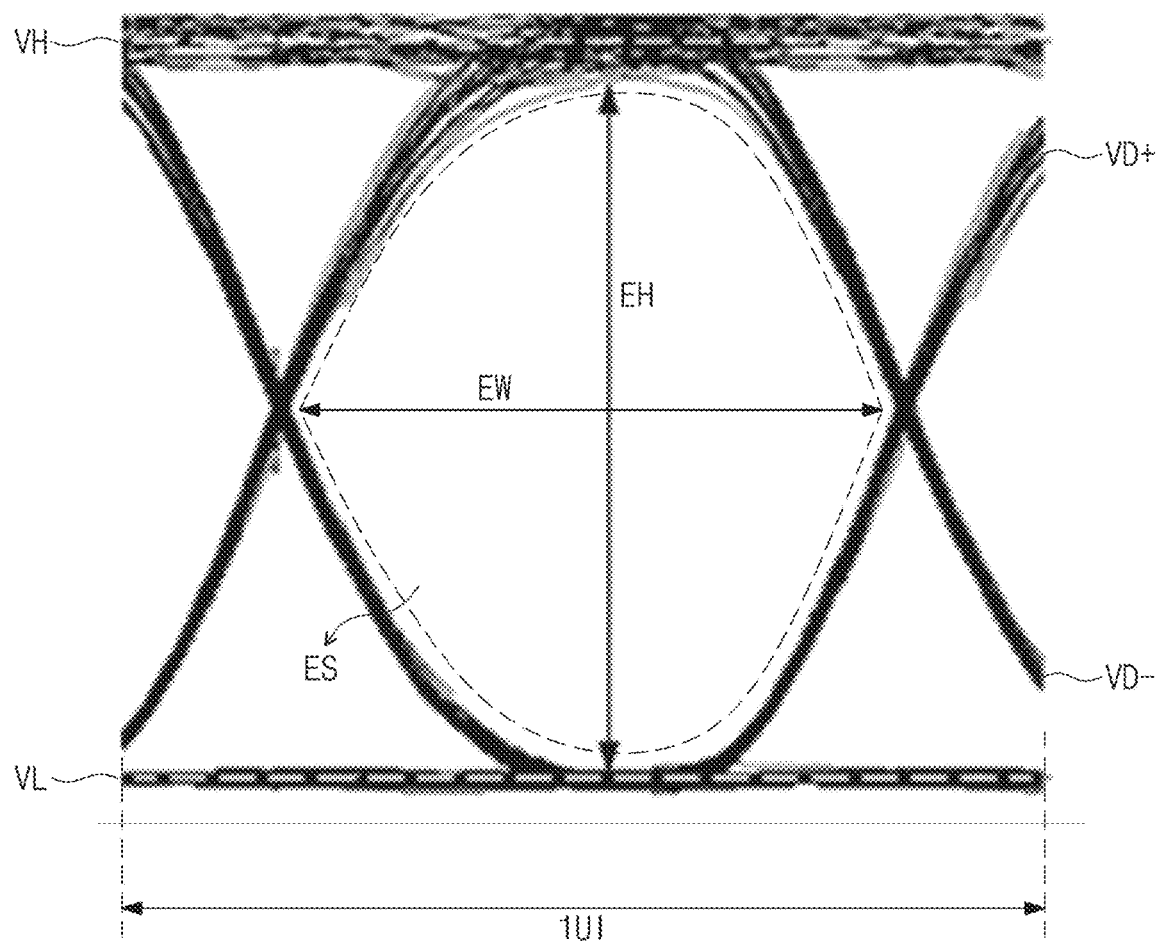
FIG. 12 is a diagram illustrating an eye pattern of an equalized signal of FIG. 5.

FIG. 12 is a diagram illustrating an eye pattern of an equalized signal of FIG. 5.

Referring to FIGS. 5 and 12, the second FoM measuring circuit 123b may measure a FoM value for an equalized signal based on an eye diagram. In FIG. 12, a horizontal axis represents a time, and a vertical axis represents a voltage level. For brief description, the eye diagram for 1UI (unit interval) is illustrated in FIG. 12. In FIG. 12, VH indicates a voltage level corresponding to a logical value 1, and VL indicates a voltage level corresponding to a logical value of 0.

In an embodiment, a region of an eye shape may be defined by voltage waveforms of the first equalized voltage VD+ and the second equalized voltage VD−.

The second FoM measuring circuit 123b may measure an eye height EH of the eye diagram. The second FoM measuring circuit 123b may measure an eye width EW of the eye diagram.

The second FoM measuring circuit 123b may measure an eye area of the eye diagram. For example, the second FoM measuring circuit 123b may measure the area of the region illustrated by a dashed line.

The second FoM measuring circuit 123b may measure the FoM value based on at least one of the measured eye height EH, the measured eye width EW, and the measured eye area. However, the present disclosure is not limited thereto. For example, the second FoM measuring circuit 123b measures the FoM value based on various parameters.

In an embodiment, as the eye height EH, the eye width EW, and the eye area increases, the FoM value measured by the second FoM measuring circuit 123b may become greater.

Figure 13:
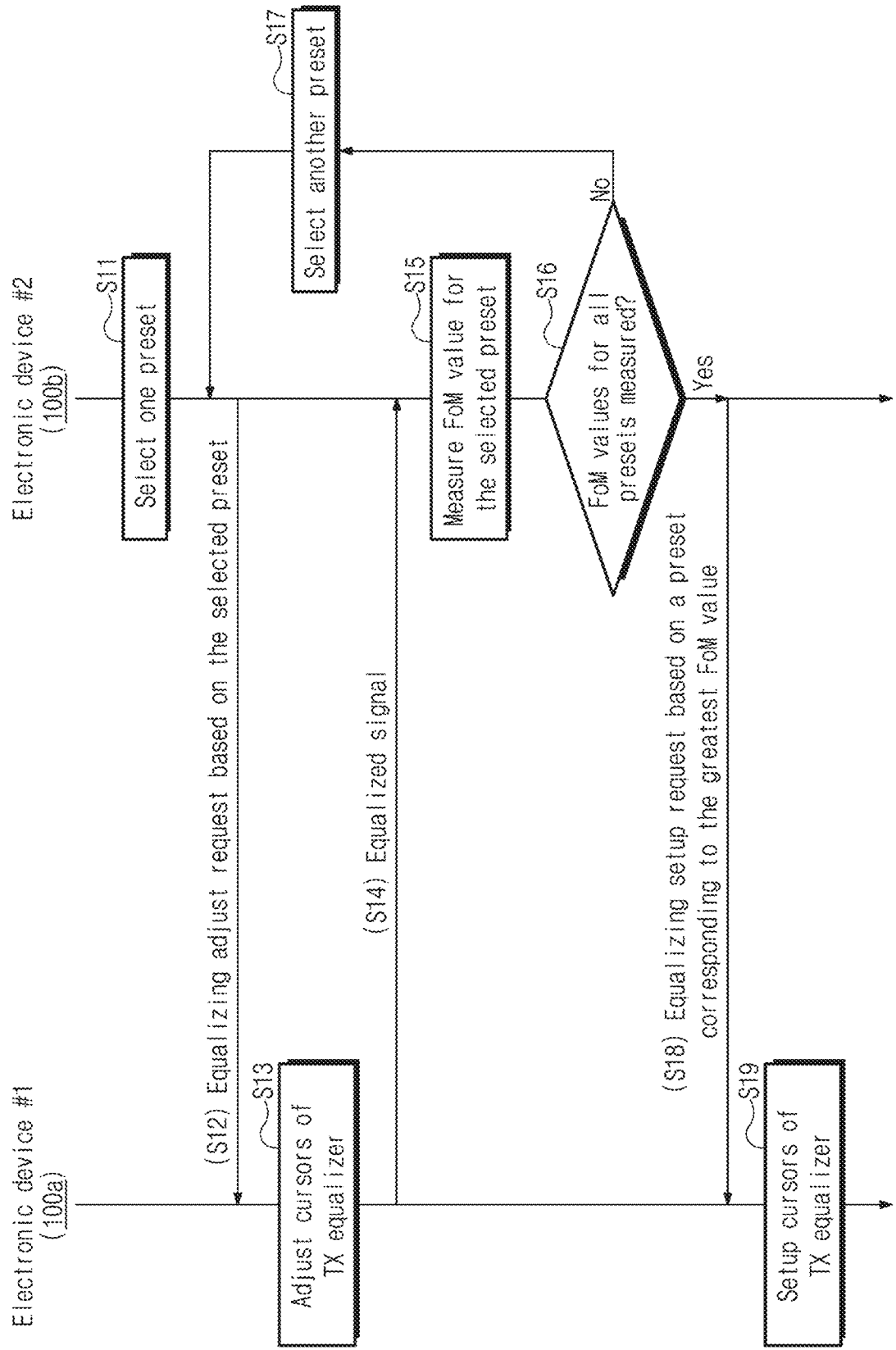
FIG. 13 is a flowchart illustrating operation S3 of FIG. 4 according to an embodiment.

FIG. 13 is a flowchart illustrating operation S3 of FIG. 4 according to an embodiment.

Referring to FIGS. 4, 5, and 13, operation S3 may include operation S11 to operation S19. In operation S11, the second electronic device 100b may select one preset. For example, the second control logic circuit may select one of the 0-th to ninth presets P0 to P9 stored in the second preset register circuit 121b.

In operation S12, the second electronic device 100b may provide the first electronic device 100a with the equalizing adjust request that is based on the selected preset. For example, under control of the second control logic circuit, the second equalizing request circuit may output the equalizing adjust request including the preset identifier of the selected preset through the second channel CH2.

In operation S13, the first electronic device 100a may adjust cursors of the first transmission equalizer 110a. For example, the first control logic circuit 125a may identify the pre-cursor Cpre and the post-cursor Cpost corresponding to the preset identifier included in the equalizing adjust request. The first control logic circuit 125a may adjust cursors of the FIR filter "FIR" included in the first transmission equalizer 110a based on the identified pre-cursor Cpre and post-cursor Cpost.

In operation S14, the first electronic device 100a may output the equalized signal to the second electronic device 100b based on the adjusted cursors. For example, the first transmission equalizer 110a may generate the equalized signal based on the original signal provided from the first signal generating circuit 122a by using the FIR filter "FIR". The first transmission equalizer 110a may output the equalized signal to the first channel CH1. In this case, the equalized signal transferred through the first channel CH1 may be a signal generated based on the selected preset. That is, the equalized signal that the first transmission equalizer 110a outputs may be a signal corresponding to the selected preset.

In operation S15, the second electronic device 100b may measure the FoM value for the selected preset. For example, the second FoM measuring circuit 123b may measure the FoM value for the selected preset based on the equalized signal received in operation S14.

In operation S16, the second electronic device 100b may determine whether FoM values for all of the presets are measured. For example, the second control logic circuit may determine whether FoM values for all of the presets stored in the second control logic circuit are measured. That is, the second control logic circuit may determine whether FoM values for all of the 0-th to ninth presets P0 to P9 are measured. When it is determined that a preset whose FoM value is not measured is present in the 0-th to ninth presets P0 to P9, operation S17 may be performed. When it is determined that the FoM values for all of the 0-th to ninth presets P0 to P9 are measured, operation S18 may be performed.

In operation S17, the second electronic device 100b may select another preset. For example, the second control logic circuit may select another preset whose FoM value is not measured, from among the 0-th to ninth presets P0 to P9 stored in the second preset register circuit 121b. That is, through the above scheme, the second electronic device 100b may sequentially measure the FoM values for all of the 0-th to ninth presets P0 to P9. In other words, the second electronic device 100b may perform the sweep operation with respect to all of the 0-th to ninth presets P0 to P9. However, the present disclosure is not limited thereto. An embodiment in which the second electronic device 100b performs the sweep operation only with respect to some of the 0-th to ninth presets P0 to P9 will be described in detail with reference to FIGS. 14 to 19.

In operation S18, the second electronic device 100b may provide the first electronic device 100a with the equalizing setup signal that is based on the preset corresponding to the highest FoM value. For example, the second control logic circuit may compare the FoM values for the 0-th to ninth presets P0 to P9. That is, the second control logic circuit may determine a preset corresponding to the highest FoM value from among the 0-th to ninth presets P0 to P9. In this case, under control of the second control logic circuit, the second equalizing request circuit may output the equalizing setup request including the preset identifier of the determined preset to the second channel CH2.

In operation S19, the first electronic device 100a may adjust cursors of the first transmission equalizer 110a. For example, the first control logic circuit 125a may identify the pre-cursor Cpre and the post-cursor Cpost corresponding to the preset identifier included in the equalizing setup request. The first control logic circuit 125a may set up the cursors of the FIR filter "FIR" included in the first transmission equalizer 110a based on the identified pre-cursor Cpre and post-cursor Cpost. That is, the cursors of the first transmission equalizer 110a may be set up based on an optimal preset that is determined as a result of comparing the FoM values for the 0-th to ninth presets P0 to P9.

FIG. 14 is a diagram illustrating a method for classifying a preset type, according to an embodiment of the present disclosure.

Referring to FIGS. 5, 9, and 14, the second preset register circuit 121b may store the 0-th to ninth presets P0 to P9. The 0-th to ninth presets P0 to P9 may be classified based on corresponding preshoot and de-emphasis magnitudes. For example, the 0-th to ninth presets P0 to P9 may be classified based on whether a corresponding preshoot magnitude is 0 and whether a corresponding de-emphasis magnitude is 0.

A preset whose both preshoot and de-emphasis magnitudes are 0 may be classified as a first preset type. For example, the preshoot and de-emphasis magnitudes corresponding to the fourth preset P4 may be 0. In this case, the fourth preset P4 may be referred to as having the first preset type.

A preset in which a preshoot magnitude is 0 and a de-emphasis magnitude is not 0 may be classified as a second preset type. For example, in an embodiment, a preshoot magnitude corresponding to each of the 0-th preset to the third preset P3 may be 0, and a de-emphasis magnitude corresponding to each of the 0-th preset to the third preset P3 is not 0.

A preset in which neither a preshoot magnitude is 0 and a de-emphasis magnitude is 0 may be classified as a third preset type. For example, in an embodiment, the preshoot and de-emphasis magnitudes corresponding to each of the seventh preset P7 and the eighth preset P8 is not 0.

A preset in which a preshoot magnitude is not 0 and a de-emphasis magnitude is 0 may be classified as a fourth preset type. For example, in an embodiment, a preshoot magnitude corresponding to each of the fifth preset P5, the sixth preset P6, and the ninth preset P9 is not 0, and a de-emphasis magnitude corresponding to each of the fifth preset P5, the sixth preset P6, and the ninth preset P9 may be 0.

In an embodiment, the second control logic circuit may omit the measurement of FoM values for some of the plurality of presets, based on the first to fourth preset types. In this case, the sweep for the plurality of presets may be simplified, and the link equalization operation may be performed more quickly. The sweep scheme that the second control logic circuit determines will be described in detail with reference to the following drawings.

Figure 15:
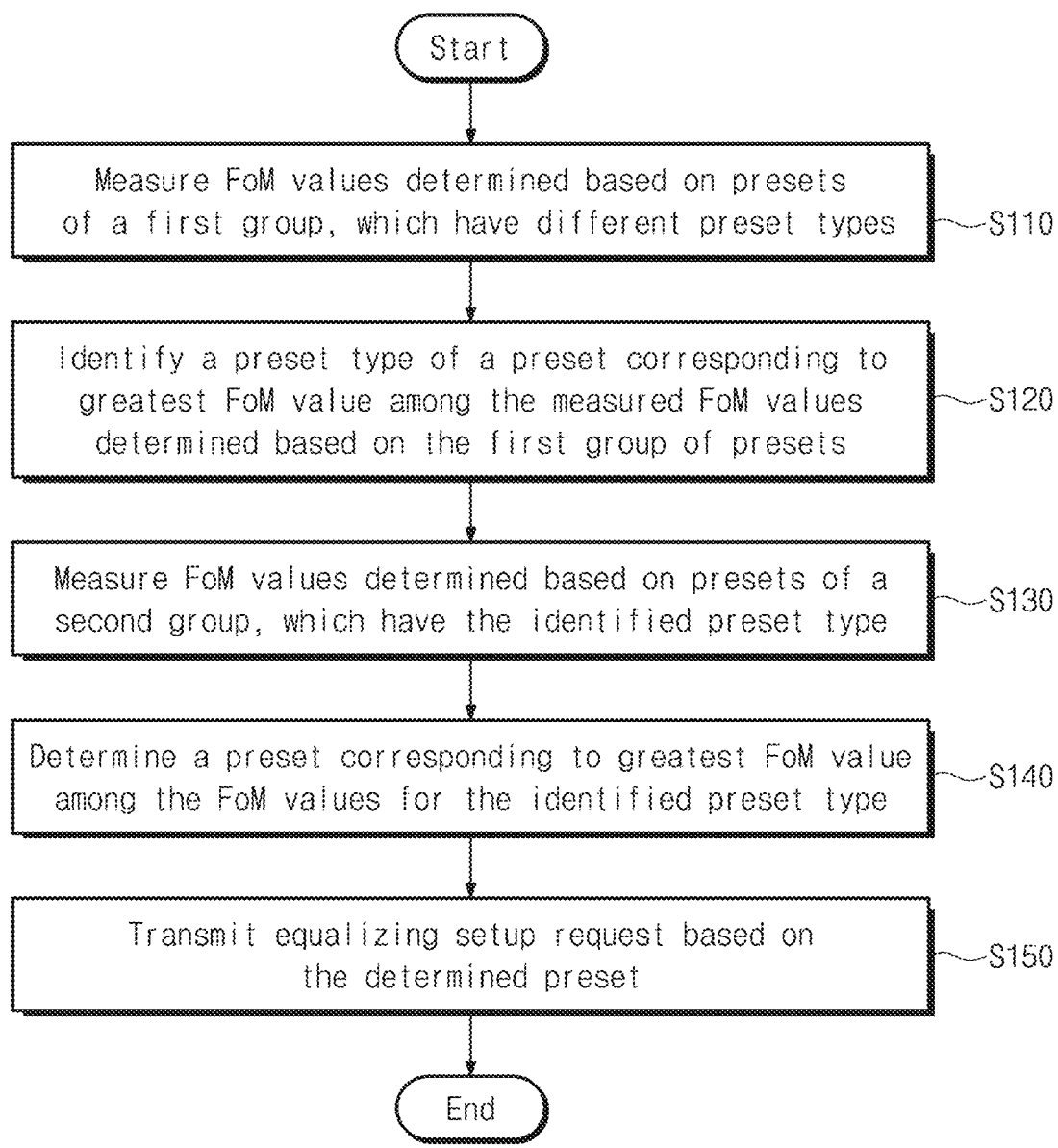
FIG. 15 is a flowchart illustrating operation S3 of FIG. 4 according to an embodiment in detail.

FIG. 15 is a flowchart illustrating operation S3 of FIG. 4 according to an embodiment in detail.

Referring to FIGS. 4, 5, 9, 14, and 15, operation S3 may include operation S110 to operation S150.

In operation S110, the second electronic device 100b may measure a plurality of FoM values determined based on a first group of presets having different preset types. For example, the second equalizing controller 120b may first measure FoM values for the first group of presets among the 0-th to ninth presets P0 to P9 stored in the second preset register circuit 121b. In this case, the first group of presets may have different preset types.

In an embodiment, the first group may include one preset for each of the first to fourth preset types. For example, the first group may include the greatest preshoot and/or de-emphasis for each of the first to fourth preset types. For example, the first group may include the fourth preset P4 (corresponding to the first preset type), the 0-th preset P0 (corresponding to the second preset type), the seventh preset P7 (corresponding to the third preset type), and the ninth preset P9 (corresponding to the fourth preset type). However, the present disclosure is not limited thereto. For example, the first group may include an arbitrary preset for each of the first to fourth preset types.

In an embodiment, the fourth preset P4 may be a sole preset having the first preset type.

In an embodiment, the 0-th preset P0 may be a preset corresponding to the greatest de-emphasis magnitude (e.g., −6.0±1.5 dB) from among presets having the second preset type.

In an embodiment, the seventh preset P7 may be a preset corresponding to the greatest de-emphasis magnitude (e.g., −6.0±1.5 dB) from among presets having the third preset type.

In an embodiment, the ninth preset P9 may be a preset corresponding to the greatest preshoot magnitude (e.g., 3.5±1.5 dB) from among presets having the fourth preset type.

In an embodiment, the FoM value according to the preshoot and the de-emphasis may have a tendency depending on a communication environment of the first electronic device 100a and the second electronic device 100b. Accordingly, in the case where there are preferentially measured FoM values for presets of the first to fourth preset types, which correspond to the greatest preshoot and/or de-empha- sis, a representative FoM value for each of the first to fourth preset types may be measured.

The manner in which the first electronic device 100a and the second electronic device 100b operate in operation S110 will be described in detail with reference to FIG. 16.

In operation S120, the second electronic device 100b may identify a preset type of a preset corresponding to the greatest FoM value among the FoM values measured based on the first group of presets. For example, the second control logic circuit may compare the FoM values for the first group of presets (for example, the 0-th, fourth, seventh, and ninth presets P0, P4, P7, and P9) measured in operation S110. The second control logic circuit may identify a preset type of the preset corresponding to the greatest FoM value based on the comparison result. Below, for brief description, the description will be given under the condition that the FoM value for the 0-th preset P0 is the greatest. In this case, the second control logic circuit may identify the second preset type being the preset type of the 0-th preset P0. However, the present disclosure is not limited thereto. For example, embodiments in which an arbitrary preset type is identified in operation S120 will be described in detail with reference to FIGS. 18A to 18D.

In operation S130, the second electronic device 100b may measure a plurality of FoM values determined based on a second group of presets having the identified preset type. For example, the second equalizing controller 120b may measure FoM values for the second group of presets among the presets stored in the second preset register circuit 121b. In this case, the second group of presets may have the same preset type.

For example, when the second preset type is identified in operation S120, the second equalizing controller 120b may measure the FoM values for the second group of presets having the second preset type. For example, the second equalizing controller 120b may measure FoM values for the first to third presets P1 to P3. In an embodiment, the FoM value for the 0-th preset P0 measured in operation S110 above are not measured. That is, the first group and the second group may have a disjoint relationship. In this case, because the number of times of FoM measurement decreases, the link equalization speed may be increased. However, the present disclosure is not limited thereto.

In operation S140, the second electronic device 100b may determine a preset corresponding to the greatest FoM value among the FoM values for the identified preset type. That is, the second control logic circuit may compare FoM values for all of the presets having the preset type identified in operation S120. For example, the second control logic circuit may compare FoM values, which correspond to presets having the preset type identified in operation S120, from among the FoM values measured in operation S110 and operation S130. For example, when the second preset type is identified in operation S120, the second control logic circuit may compare FoM values for the 0-th to third presets P0 to P3. In this case, the second control logic circuit may determine a preset corresponding to the greatest FoM value from among the 0-th to third presets P0 to P3.

The manner in which the first electronic device 100a and the second electronic device 100b operate in operation S140 will be described in detail with reference to FIGS. 17 and 18A to 18D.

In operation S150, the second electronic device 100b may transmit the equalizing setup request based on the determined preset. For example, the second equalizing request circuit may transmit the equalizing setup request including the preset identifier for the preset determined in operation S140 to the first electronic device 100a. For example, when the first preset P1 is determined in operation S140, the second equalizing request circuit may provide the first equalizing controller 120*a* with the equalizing setup request including the preset identifier of "P1" under control of the second control logic circuit.

In an embodiment, the number of FoM values measured in operation S120 and operation S140 may be less than the number of presets targeted for measurement of a FoM value in the embodiment of FIG. 13. That is, according to an embodiment of the present disclosure, the number of presets targeted for measurement of a FoM value may decrease. In this case, a time utilized for the link equalization may decrease. That is, according to an embodiment of the present disclosure, the link equalization operation between the first electronic device 100*a* and the second electronic device 100*b* may be performed at a higher speed.

In an embodiment, a time allocated for the link equalization between the first electronic device 100*a* and the second electronic device 100*b* may be uniform. For example, a time of 24 ms may be allocated for the link equalization between the first electronic device 100*a* and the second electronic device 100*b*. According to an embodiment of the present disclosure, the link equalization operation between the first electronic device 100*a* and the second electronic device 100*b* may utilize a time that is shorter than the allocated time. That is, according to an embodiment of the present disclosure, a budget (e.g., a difference between an allocated time and an actually required time) for the link equalization operation may be secured. The manner in which utilizing the secured budget will be described in detail with reference to FIG. 19.

Figure 16:
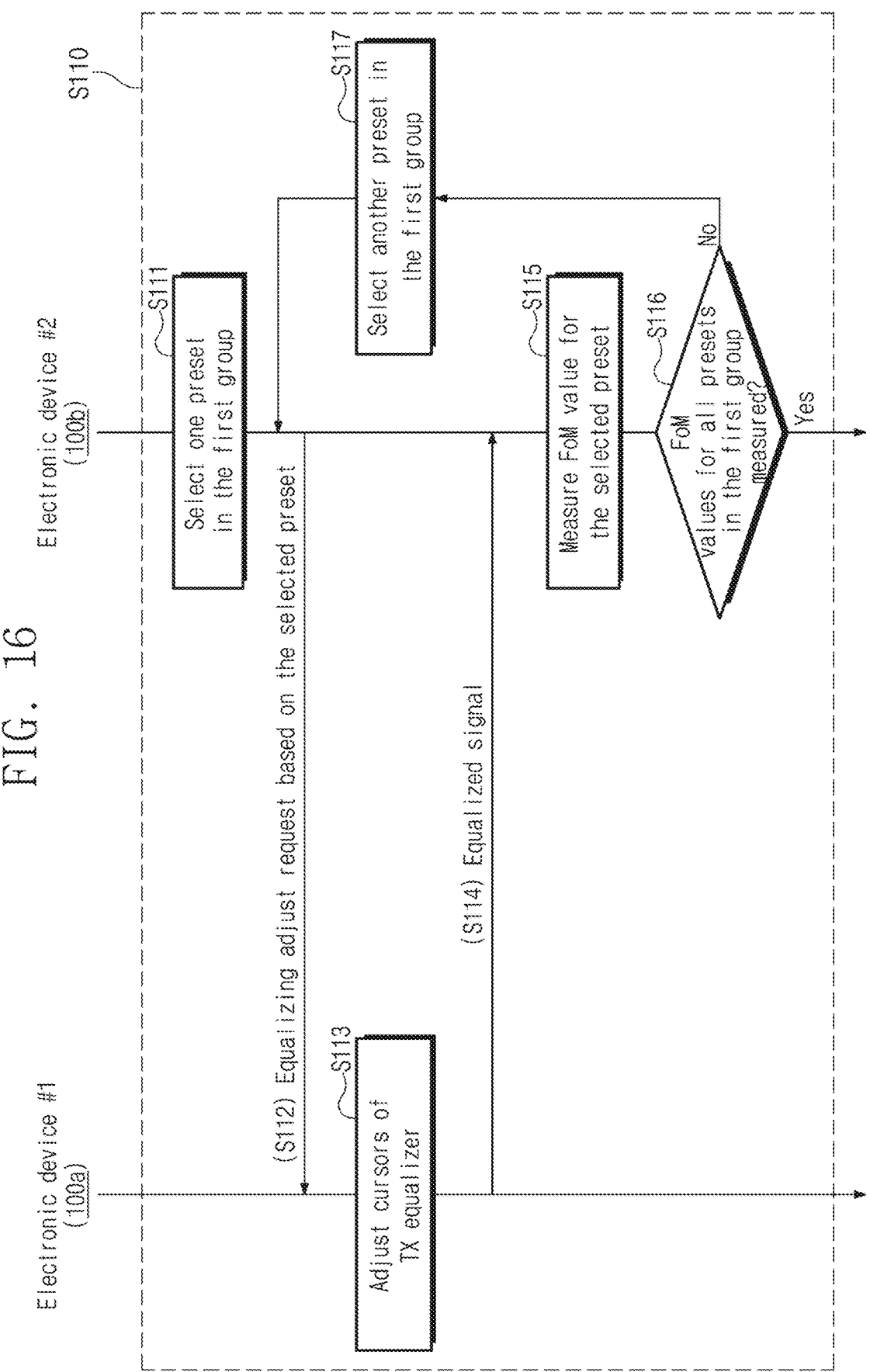
FIG. 16 is a flowchart illustrating operation S110 of FIG. 15 in detail.

FIG. 16 is a flowchart illustrating operation S110 of FIG. 15 in detail.

Referring to FIGS. 4, 5, 9, and 13 to 16, operation S110 may include operation S111 to operation S117.

In operation S111, the second electronic device 100*b* may select one preset in the first group. For example, the second control logic circuit may select one of the fourth preset P4, the 0-th preset P0, the seventh preset P7, and the ninth preset P9.

In operation S112, the second electronic device 100*b* may provide the first electronic device 100*a* with the equalizing adjust request that is based on the selected preset.

In operation S113, the first electronic device 100*a* may adjust cursors of the first transmission equalizer 110*a*.

In operation S114, the first electronic device 100*a* may output the equalized signal to the second electronic device 100*b* based on the adjusted cursors.

In operation S115, the second electronic device 100*b* may measure the FoM value for the selected preset.

Operation S112 to operation S115 are similar to operation S12 to operation S15 described above, and thus, additional description thereof will be omitted to avoid redundancy.

In operation S116, the second electronic device 100*b* may determine whether FoM values for all of the presets in the first group are measured. For example, the second control logic circuit may determine whether a FoM value for each of the presets in the first group is measured. That is, the second control logic circuit may determine whether a FoM value for one preset is measured for each of the first to fourth preset types. When it is determined that a preset whose FoM value is not measured is present in the presets in the first group, operation S117 may be performed. When it is determined that the FoM values for all of the presets in the first group are measured, operation S110 may end, and operation S120 may be performed.

In operation S117, the second electronic device 100*b* may select another preset in the first group. For example, the second control logic circuit may select a preset whose FoM value is not measured, from among the presets in the first group. That is, through the above scheme, the second electronic device 100*b* may sequentially measure a FoM value for a representative preset of each of the first to fourth preset types. In other words, the second electronic device 100*b* may perform the sweep operation one by one for each of the first to fourth preset types.

Figure 17:
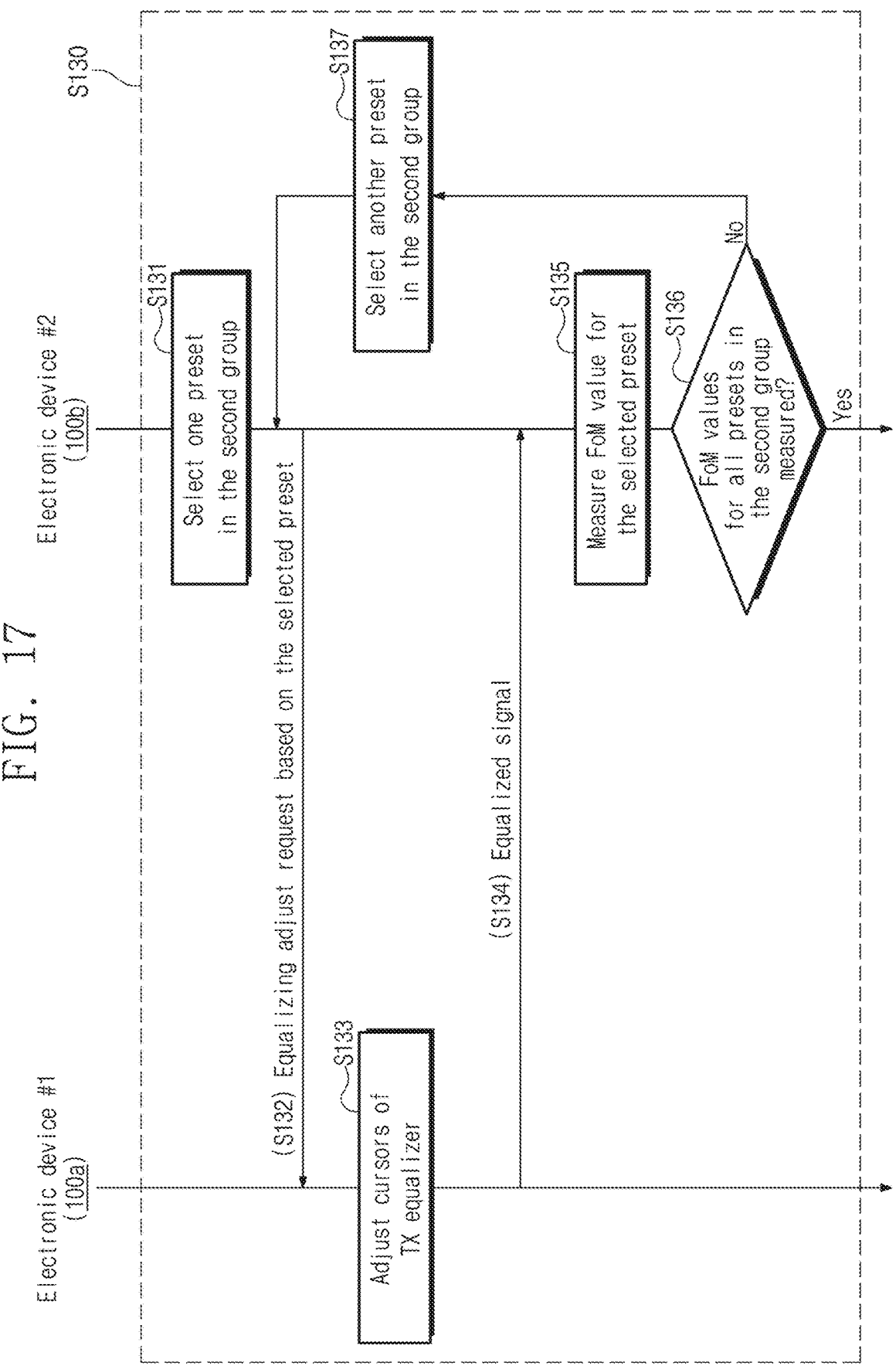
FIG. 17 is a flowchart illustrating operation S130 of FIG. 15 in detail.

FIG. 17 is a flowchart illustrating operation S130 of FIG. 15 in detail.

Referring to FIGS. 4, 5, 9, and 14 to 17, operation S130 may include operation S131 to operation S137. Below, for brief description, an embodiment in which the second preset type is identified in operation S120 will be described, but the present disclosure is not limited thereto.

In operation S131, the second electronic device 100*b* may select one preset in the second group. For example, the second control logic circuit may select one of presets in the second group. For example, when the second preset type is identified in operation S120, the second group may include presets having the second preset type. In this case, the second group may include the first to third presets P1 to P3.

In operation S132, the second electronic device 100*b* may provide the first electronic device 100*a* with the equalizing adjust request that is based on the selected preset.

In operation S133, the first electronic device 100*a* may adjust cursors of the first transmission equalizer 110*a*.

In operation S134, the first electronic device 100*a* may output the equalized signal to the second electronic device 100*b* based on the adjusted cursors.

In operation S135, the second electronic device 100*b* may measure the FoM value for the selected preset.

Operation S132 to operation S135 are similar to operations S112 to operation S115 described above, and thus, additional description thereof will be omitted to avoid redundancy.

In operation S136, the second electronic device 100*b* may determine whether FoM values for all of the presets in the second group are measured. For example, the second control logic circuit may determine whether FoM values for all of the presets in the second group are measured. When it is determined that a preset whose FoM value is not measured is present in the presets in the second group, operation S137 may be performed. When it is determined that the FoM values for all of the presets in the second group are measured, operation S130 may end, and operation S140 may be performed.

In operation S137, the second electronic device 100*b* may select another preset in the second group. For example, the second control logic circuit may select a preset whose FoM value is not measured, from among the presets in the second group. That is, through the above scheme, the second electronic device 100*b* may sequentially measure FoM values for all of the presets having the preset type identified in operation S120. In other words, the second electronic device 100*b* may perform the sweep operation for presets having the identified preset type.

FIGS. 18A to 18D are diagrams illustrating a first group and a second group of FIG. 15.

An embodiment in which the first preset type is identified in operation S120 will be described with reference to FIGS. 4, 5, 9, 14 to 17, and 18A, an embodiment in which the second preset type is identified in operation S120 will be described with reference to FIGS. 4, 5, 9, 14 to 17, and 18B, an embodiment in which the third preset type is identified in operation S120 will be described with reference to FIGS. 4, 5, 9, 14 to 17, and 18C, and an embodiment in which the fourth preset type is identified in operation S120 will be described with reference to FIGS. 4, 5, 9, 14 to 17, and 18D.

First groups GR1 of FIGS. 18A to 18D may be identical to each other. For example, the first group GR1 may include a preset corresponding to the greatest preshoot and/or de-emphasis for each of the first to fourth preset types. In this case, the first group GR1 may include the fourth preset P4, the 0-th preset P0, the seventh preset P7, and the ninth preset P9. That is, in operation S110 of FIG. 15, the second electronic device 100b may measure FoM values for the fourth preset P4, the 0-th preset P0, the seventh preset P7, and the ninth preset P9, respectively. However, the present disclosure is not limited thereto. For example, the present disclosure may include various embodiments in which the first group includes one preset for each of the first to fourth preset types.

Figure 18A:
FIGS. 18A to 18D are diagrams illustrating a first group and a second group of FIG. 15.

Referring to FIGS. 15 and 18A, a FoM value corresponding to the fourth preset P4 among the presets in the first group GR1 may be the greatest. In this case, in operation S120, the second control logic circuit may identify the first preset type corresponding to the fourth preset P4.

In an embodiment, the fourth preset P4 may be a sole preset having the first preset type from among the presets stored in the second preset register circuit 121b. That is, in an embodiment, the remaining preset other than the fourth preset P4 does not have the first preset type. In other words, in an embodiment, a preset is not included in a second group GR2 (e.g., the second group GR2 may correspond to an empty set). In this case, in an embodiment, in operation S130, the second electronic device 100b does not additionally measure an FoM value, and in operation S150, the second electronic device 100b may transmit the equalizing setup request including the preset identifier of "P4" corresponding to the fourth preset P4 to the first electronic device 100a.

In an embodiment, when the FoM value corresponding to the fourth preset P4 among the presets in the first group GR1 is the greatest, FoM values for the remaining presets other than the presets in the first group GR1 are not measured. That is, in an embodiment, FoM values for the first, second, third, fifth, sixth, and eighth presets P1, P2, P3, P5, P6, and P8 among the 0-th to ninth presets P0 to P9 are not measured. In this case, the measurement of the FoM values for six presets among ten presets stored in the second preset register circuit 121b may be omitted. Accordingly, a time taken to set up the first transmission equalizer 110a may be reduced by as much as about 60%.

Figure 18B:
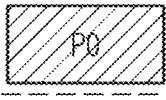

Referring to FIGS. 15 and 18B, a FoM value corresponding to the 0-th preset P0 among the presets in the first group GR1 may be the greatest. In this case, in operation S120, the second control logic circuit may identify the second preset type corresponding to the 0-th preset P0.

In an embodiment, the first to third presets P1 to P3 among the presets stored in the second preset register circuit 121b may have the second preset type. In this case, the second group GR2 may include the first to third presets P1 to P3, and in operation S130, the second electronic device 100b may measure a FoM value for each preset in the second group GR2. In operation S140, the second electronic device 100b may compare the FoM value for the 0-th preset P0 (e.g., the FoM value measured in operation S110) and the FoM values for the first to third presets P1 to P3 (e.g., the FoM values measured in operation S130) and may determine an optimal preset (e.g., a preset corresponding to the highest FoM value) among the 0-th to third presets P0 to P3. In operation S150, the second electronic device 100b may transmit the equalizing setup request including the preset identifier for the determined preset to the first electronic device 100a.

In an embodiment, when the FoM value corresponding to the 0-th preset P0 among the presets in the first group GR1 is the greatest, FoM values for the remaining presets other than the presets in the first group GR1 and the presets of the second preset type are not measured. That is, in an embodiment, FoM values for the fifth, sixth, and eighth presets P5, P6, and P8 among the 0-th to ninth presets P0 to P9 are not measured. In this case, the measurement of the FoM values for six presets among ten presets stored in the second preset register circuit 121b may be omitted. Accordingly, a time taken to set up the first transmission equalizer 110a may be reduced by as much as about 30%.

Figure 18C:
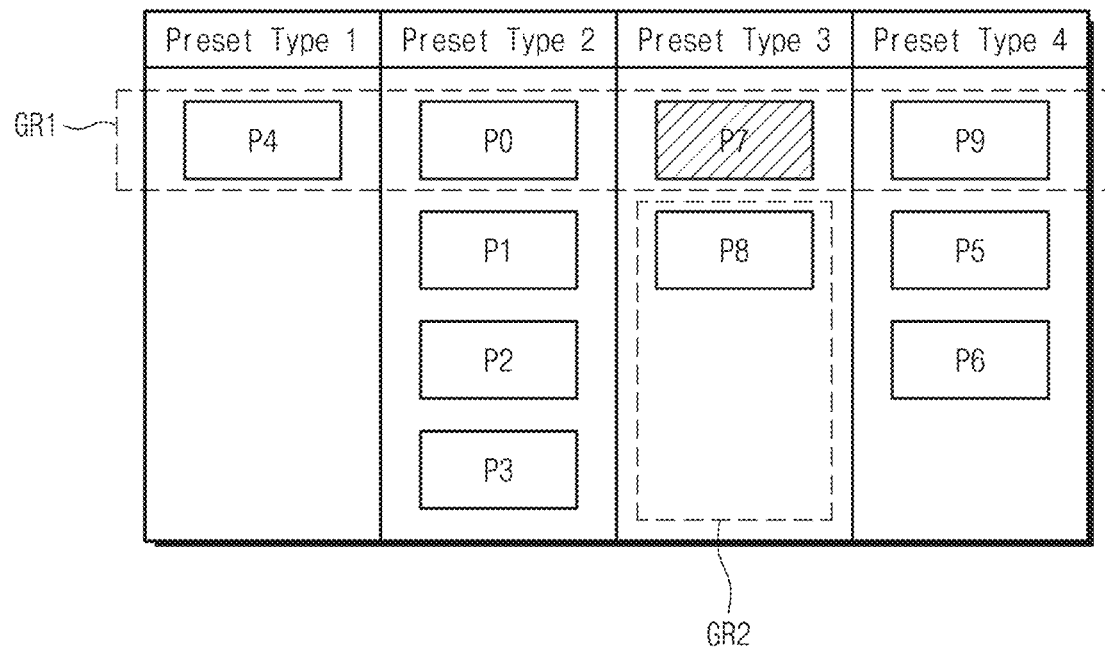

Referring to FIGS. 15 and 18C, a FoM value corresponding to the seventh preset P7 among the presets in the first group GR1 may be the greatest. In this case, in operation S120, the second control logic circuit may identify the third preset type corresponding to the seventh preset P7.

In an embodiment, the eighth preset P8 among the presets stored in the second preset register circuit 121b may also have the third preset type. In this case, the second group GR2 may include the eighth preset P8.

In an embodiment, when the FoM value corresponding to the seventh preset P7 among the presets in the first group GR1 is the greatest, FoM values for the remaining presets other than the presets in the first group GR1 and the presets of the third preset type are not measured. That is, in an embodiment, FoM values for the first, second, third, fifth, and sixth presets P1, P2, P3, P5, and P6 among the 0-th to ninth presets P0 to P9 are not measured. In this case, the measurement of the FoM values for five presets among ten presets stored in the second preset register circuit 121b may be omitted. Accordingly, a time taken to set up the first transmission equalizer 110a may be reduced by as much as about 50%.

Figure 18D:
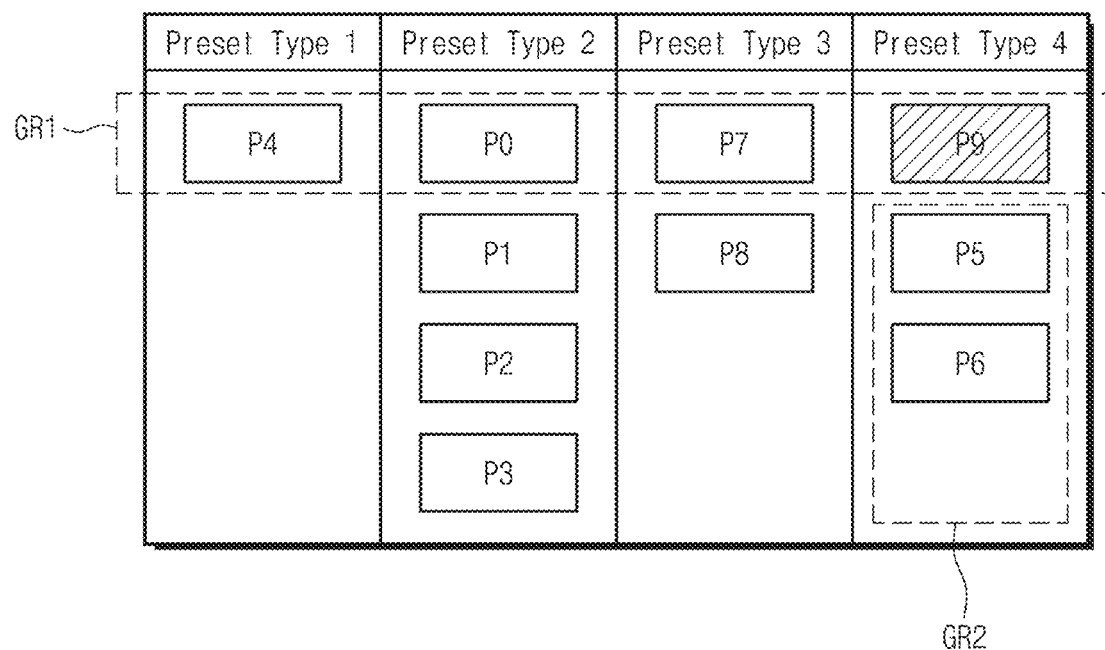

Referring to FIGS. 15 and 18D, a FoM value corresponding to the ninth preset P9 among the presets in the first group GR1 may be the greatest. In this case, in operation S120, the second control logic circuit may identify the fourth preset type corresponding to the ninth preset P9.

In an embodiment, the fifth and sixth presets P5 and P6 among the presets stored in the second preset register circuit 121b may also have the fourth preset type. In this case, the second group GR2 may include the fifth and sixth presets P5 and P6.

In an embodiment, when the FoM value corresponding to the ninth preset P9 among the presets in the first group GR1 is the greatest, the measurement of FoM values for the remaining presets other than the presets in the first group GR1 and the presets of the fourth preset type may be omitted. That is, in an embodiment, FoM values for the first, second, third, and eighth presets P1, P2, P3, and P8 among the 0-th to ninth presets P0 to P9 are not measured. In this case, the measurement of the FoM values for four presets among ten presets stored in the second preset register circuit 121b may be omitted. Accordingly, a time taken to set up the first transmission equalizer 110a may be reduced by as much as about 40%.

That is, according to an embodiment of the present disclosure, the measurement of FoM values for four to six presets among ten presets stored in the second preset register circuit 121b may be omitted. Accordingly, a time taken to set up the first transmission equalizer 110a may be reduced by as much as about 30% to about 60%. That is, the budget for the time taken to set up the first transmission equalizer 110a may be secured. The manner in which utilizing the secured budget will be described in detail with reference to FIG. 19.

Figure 19:
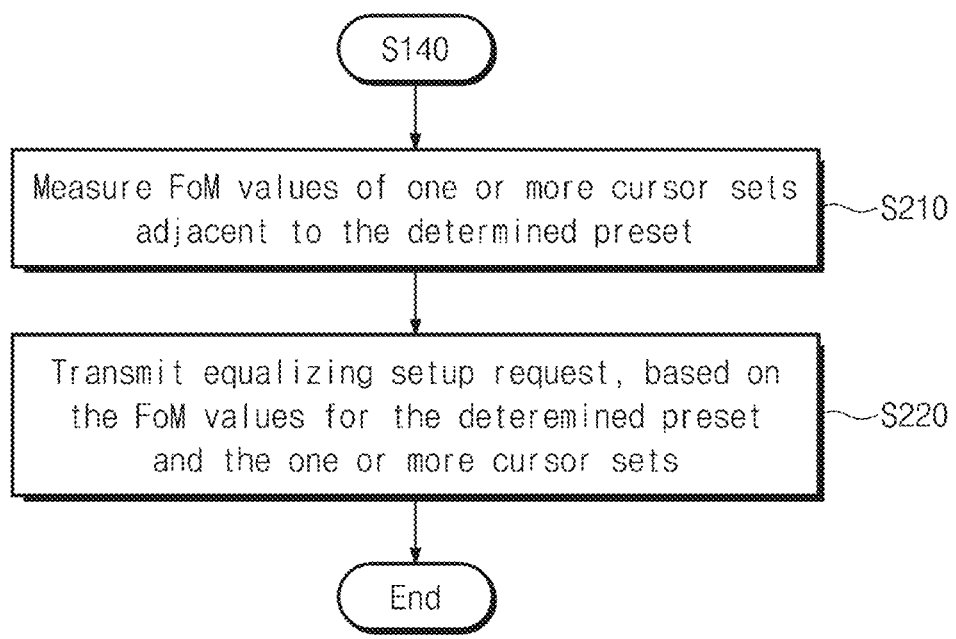
FIG. 19 is a flowchart illustrating operation S3 according to an embodiment.

FIG. 19 is a flowchart illustrating operation S3 according to an embodiment.

Referring to FIGS. 4, 5, 10, 14, 15, and 19, after operation S110 to S140 are performed, operation S210 and operation S220 may be performed instead of operation S150. Operation S140 is described in detail with reference to FIGS. 15 to 17, and thus, additional description thereof will be omitted to avoid redundancy.

In operation S210, the second electronic device 100*b* may measure FoM values for one or more cursor sets adjacent to the determined preset. For example, the second control logic circuit may measure FoM values for cursor sets adjacent to a cursor set for the determined preset, which are stored in the second preset register circuit 121*b*. The cursor sets adjacent to the cursor set for the determined preset will be described with reference to FIG. 20 in detail.

In an embodiment, the number of cursor sets whose FoM values are measured in operation S210 may be determined based on the secured budget for the time taken to set up the first transmission equalizer 110*a*. For example, when the secured budget (e.g., a free time) is great, FoM values for more cursor sets may be measured.

In operation S220, the second electronic device 100*b* may transmit the equalizing setup request to the first electronic device 100*a*, based on the FoM values for the determined preset and the one or more cursor sets. For example, the second control logic circuit may compare the FoM values for the determined preset and the one or more cursor sets. When the FoM value for the determined preset is the highest, the second equalizing request circuit may transmit the equalizing setup request including the preset identifier for the determined preset to the first equalizing controller 120*a*. When the FoM value for a specific cursor set is the highest, the second equalizing request circuit may transmit the equalizing setup request including the pre-cursor and the post-cursor of the cursor set to the first equalizing controller 120*a*.

FIG. 20 is a diagram illustrating a determined preset and cursor sets adjacent thereto, which are stored in the second preset register circuit 121*b*.

Below, for brief description, it is assumed that the second preset register circuit 121*b* stores the same pre-cursor and post-cursor as the first preset register circuit 121*a* with regard to the 0-th to ninth presets P0 to P9. That is, below, an embodiment in which the pre-cursor and the post-cursor of the second preset register circuit 121*b* are determined in units of 1/24 granularity will be described. However, the present disclosure is not limited thereto. For example, in embodiments, the pre-cursor and the post-cursor of the second preset register circuit 121*b* may be determined by a unit different from that of the first preset register circuit 121*a*. For example, in an embodiment, the pre-cursor and the post-cursor of the second preset register circuit 121*b* are determined in units of 1/32 granularity.

Also, below, for brief description, an embodiment in which the eighth preset P8 is determined in operation S140 will be described. However, the present disclosure is not limited thereto.

Continuing to refer to FIGS. 5, 10, 14, 15, 19, and 20, the preset (e.g., the eighth preset P8) determined in operation S140 may correspond to a pre-cursor magnitude of "3/24" and a post-cursor magnitude of "3/24". In this case, a cursor set adjacent to the eighth preset P8 may refer to eight cursor sets (e.g., shaded cursor sets) adjacent to the eighth preset P8. For example, pre-cursor magnitudes of the cursor sets adjacent to the eighth preset P8 may be included in a range of "3/24±1/24", and post-cursor magnitudes of the cursor sets adjacent to the eighth preset P8 may be included in a range of "3/24±1/24".

In an embodiment, a cursor set adjacent to a determined preset may correspond to a FoM value similar to a FoM value for the determined preset. That is, the cursor set adjacent to the determined preset may correspond to a high FoM value. Accordingly, according to an embodiment of the present disclosure, the first transmission equalizer 110*a* may be set up based on the cursor set having a high FoM value.

According to an embodiment of the present disclosure, an electronic device performing a link equalization operation at high speed and an operation method thereof may be provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operation method of an electronic device which communicates with an external device including a transmission equalizer through a first channel, the method comprising:
   measuring figure of merit (FoM) values for a first group of presets having different preset types, based on equalized signals output from the transmission equalizer adjusted based on the first group of presets;
   identifying a preset type of a first preset corresponding to a first FoM value which is a greatest value from among the FoM values for the first group of presets;
   measuring FoM values for a second group of presets having the identified preset type, based on equalized signals output from the transmission equalizer adjusted based on the second group of presets;
   determining a second preset corresponding to a second FoM value which is a greatest value from among the first FoM value and the FoM values for the second group of presets; and
   transmitting an equalizing setup request that controls the transmission equalizer to the external device, based on the determined second preset.

2. The method of claim 1, wherein the second group of presets is disjoint with the first group of presets.

3. The method of claim 1, wherein, when the second FoM value is the first FoM value, the second preset is the first preset.

4. The method of claim 1, wherein measuring the FoM values for the first group of presets comprises:
   measuring the first FoM value for the first preset;
   measuring a third FoM value for a third preset having a different preset type from the preset type of the first preset;
   measuring a fourth FoM value for a fourth preset having a different preset type from the preset type of the first preset and the preset type of the third preset; and
   measuring a fifth FoM value for a fifth preset having a different preset type from the preset type of the first preset, the preset type of the third preset, and the preset type of the fourth preset.

5. The method of claim 4, wherein measuring the first FoM value comprises:
   selecting the first preset from the presets in the first group of presets;

transmitting a first equalizing adjust request, which is based on the selected first preset, to the external device;

receiving a first equalized signal generated from the transmission equalizer in response to the first equalizing adjust request; and measuring the first FoM value based on the first equalized signal.

6. The method of claim 5, wherein the first FoM value is determined based on a parameter including at least one of an eye width, an eye height, and an eye area of an eye diagram for the first equalized signal.

7. The method of claim 5, wherein the preset type of the first preset is determined based on a preshoot magnitude and a de-emphasis magnitude of the first equalized signal.

8. The method of claim 7, wherein the preset type of the first preset is determined as a first preset type when the preshoot magnitude is 0 and the de-emphasis magnitude is 0, is determined as a second preset type when the preshoot magnitude is 0 and the de-emphasis magnitude is not 0, is determined as a third preset type when the preshoot magnitude is not 0 and the de-emphasis magnitude is not 0, and is determined as a fourth preset type when the preshoot magnitude is not 0 and the de-emphasis magnitude is 0.

9. The method of claim 8, wherein, when the first preset is of the second preset type, the first preset corresponds to a preset having a greatest de-emphasis magnitude from among presets having the second preset type, wherein, when the first preset is of the third preset type, the first preset corresponds to a preset having a greatest de-emphasis magnitude from among presets having the third preset type, and wherein, when the first preset is of the fourth preset type, the first preset corresponds to a preset having a greatest preshoot magnitude from among presets having the fourth preset type.

10. The method of claim 1, wherein the transmission equalizer comprises:

a finite impulse response (FIR) filter configured to operate based on a pre-cursor and a post-cursor.

11. The method of claim 10, wherein each of the pre-cursor and the post-cursor is configured to be changed based on the second preset.

12. The method of claim 1, wherein the electronic device includes a plurality of presets including the first group of presets and the second group of presets, and wherein a number of the plurality of presets is more than a sum of a number of the presets in the first group of presets and a number of the presets in the second group of presets.

13. An equalizing controller configured to control an external device including a transmission equalizer, the equalizing controller comprising:

a preset register circuit configured to store a plurality of presets including first to fourth presets;

an equalizing request circuit configured to sequentially output a first equalizing adjust request based on the first preset, a second equalizing adjust request based on the second preset, a third equalizing adjust request based on the third preset, and a fourth equalizing adjust request based on the fourth preset;

a figure of merit (FoM) measuring circuit configured to measure first to fourth FoM values respectively associated with the first to fourth presets, based on first to fourth equalized signals respectively output from the transmission equalizer in response to the first to fourth equalizing adjust requests; and a control logic circuit configured to determine a greatest FoM value among the first to fourth FoM values, and to identify a preset type of a preset corresponding to the determined FoM value, wherein the equalizing request circuit is configured to:

output an equalizing setup request to the external device, which is based on one of the plurality of presets, wherein the one of the plurality of presets has the identified preset type, and wherein the first to fourth presets have different preset types determined depending on preshoot magnitudes and de-emphasis magnitudes of the first to fourth equalized signals.

14. The equalizing controller of claim 13, wherein the preset type of the first preset is determined based on a first preshoot magnitude and a first de-emphasis magnitude for the first equalized signal, wherein the preset type of the second preset is determined based on a second preshoot magnitude and a second de-emphasis magnitude for the second equalized signal, wherein the preset type of the third preset is determined based on a third preshoot magnitude and a third de-emphasis magnitude for the third equalized signal, and wherein the preset type of the fourth preset is determined based on a fourth preshoot magnitude and a fourth de-emphasis magnitude for the fourth equalized signal.

15. The equalizing controller of claim 14, wherein the first preshoot magnitude is 0 and the first de-emphasis magnitude is 0, wherein the second preshoot magnitude is 0 and the second de-emphasis magnitude is not 0, wherein the third preshoot magnitude is not 0 and the third de-emphasis magnitude is not 0, and wherein the fourth preshoot magnitude is not 0 and the fourth de-emphasis magnitude is 0.

16. The equalizing controller of claim 13, wherein the external device comprises:

a transmission equalizer including a finite impulse response (FIR) filter that operates in response to the first to fourth equalizing adjust requests.

17. The equalizing controller of claim 16, wherein the FIR filter is configured to operate based on a pre-cursor and a post-cursor, and wherein the pre-cursor and the post-cursor are determined based on a preset corresponding to each of the first to fourth equalizing adjust requests.

18. The equalizing controller of claim 13, wherein the determined FoM value is the first FoM value, wherein the identified preset type is a first preset type, wherein the plurality of presets further include a fifth preset having a first preset type of the first preset, wherein the equalizing request circuit further issues a fifth equalizing adjust request which is based on the fifth preset, wherein the FoM measuring circuit measures a fifth FoM value for the fifth preset, based on a fifth equalized signal output from the external device in response to the fifth equalizing adjust request, wherein the control logic circuit compares the fifth FoM value and the first FoM value, and wherein the equalizing request circuit is configured to output the equalizing setup request based on a result of comparing the fifth FoM value and the first FoM value.

19. An operation method of an electronic device which communicates with an external device including a transmission equalizer and a first plurality of presets corresponding to a first preset type, a second plurality of presets corresponding to a second preset type, a third plurality of presets corresponding to a third preset type, and a fourth plurality of presets corresponding to a fourth preset type, the method comprising:

measuring a first figure of merit (FoM) value for a first preset, based on a first equalized signal output from the transmission equalizer adjusted based on the first preset, which is one of the first plurality of presets;

measuring a second FoM value for a second preset, based on a second equalized signal output from the transmission equalizer adjusted based on the second preset, which is one of the second plurality of presets;

measuring a third FoM value for a third preset, based on a third equalized signal output from the transmission equalizer adjusted based on the third preset, which is one of the third plurality of presets;

measuring a fourth FoM value for a fourth preset, based on a fourth equalized signal output from the transmission equalizer adjusted based on the fourth preset, which is one of the fourth plurality of presets; and identifying a preset type of a preset corresponding to a greatest FoM value among the first to fourth FOM values, wherein, when the first preset type is identified, the method further comprises:

measuring FoM values for remaining presets of the first plurality of presets other than the first preset;

determining a preset corresponding to a greatest FoM value among the first FoM value and the FoM values for the remaining presets; and outputting an equalizing setup request including a preset identifier for the determined preset to the external device.

20. The operation method of claim 19, wherein the first to fourth preset types are classified based on whether a pre-shoot magnitude and a de-emphasis magnitude of a corresponding equalized signal are 0.

* * * * *